US012297580B2

(12) United States Patent
Kwon et al.

(10) Patent No.: US 12,297,580 B2
(45) Date of Patent: May 13, 2025

(54) LAUNDRY TREATING APPARATUS

(71) Applicant: LG Electronics Inc., Seoul (KR)

(72) Inventors: Daehan Kwon, Seoul (KR); Sanghee Yoo, Seoul (KR); Jaeseok Kim, Seoul (KR); Donghyun Jin, Seoul (KR); Youngho Jung, Seoul (KR); Sangho Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/523,132

(22) Filed: Nov. 29, 2023

(65) Prior Publication Data

US 2024/0093420 A1 Mar. 21, 2024

Related U.S. Application Data

(63) Continuation of application No. 17/178,887, filed on Feb. 18, 2021, now Pat. No. 11,866,880.

(30) Foreign Application Priority Data

Feb. 19, 2020 (KR) ........................ 10-2020-0020457
Feb. 26, 2020 (KR) ........................ 10-2020-0023776
(Continued)

(51) Int. Cl.
*D06F 33/44* (2020.01)
*D06F 29/00* (2006.01)
(Continued)

(52) U.S. Cl.
CPC .......... *D06F 39/125* (2013.01); *D06F 29/005* (2013.01); *D06F 31/00* (2013.01); *H01B 17/14* (2013.01)

(58) Field of Classification Search
CPC ..................................................... D06F 39/125
See application file for complete search history.

(56) References Cited

U.S. PATENT DOCUMENTS 9,388,523 B2 7/2016 Han et al.
2006/0010934 A1 1/2006 Kim
2010/0101282 A1 4/2010 Jeong

FOREIGN PATENT DOCUMENTS

CN 101705594 5/2010
CN 204509790 7/2015
(Continued)

OTHER PUBLICATIONS

EP Extended European Search Report in European Appln. No. 21157656.6, dated Jun. 23, 2021, 9 pages.
(Continued)

*Primary Examiner* — Jason Y Ko
(74) *Attorney, Agent, or Firm* — Fish & Richardson P.C.

(57) ABSTRACT

A laundry treating apparatus incudes a first treating apparatus, a second treating apparatus that is disposed vertically below the first treating apparatus and supports the first treating apparatus, and an insulating portion that connects the first treating apparatus and the second treating apparatus to each other. The first treating apparatus includes a first cabinet that defines an external appearance of the first treating apparatus, and a first drum disposed inside the first cabinet and configured to accommodate laundry therein. The second treating apparatus includes a second cabinet that defines an external appearance of the second treating apparatus, and a second drum disposed inside the second cabinet and configured to accommodate laundry therein. The insulating portion includes an insulating material and electrically insulates the first treating apparatus and the second treating apparatus from each other.

19 Claims, 32 Drawing Sheets

(30) Foreign Application Priority Data

| | | |
|---|---|---|
| Mar. 5, 2020 | (KR) | 10-2020-0027778 |
| Oct. 14, 2020 | (KR) | 10-2020-0132544 |
| Oct. 14, 2020 | (KR) | 10-2020-0132545 |

(51) Int. Cl.

| | |
|---|---|
| ***D06F 31/00*** | (2006.01) |
| ***D06F 39/12*** | (2006.01) |
| ***H01B 17/14*** | (2006.01) |

(56) References Cited

FOREIGN PATENT DOCUMENTS

| | | |
|---|---|---|
| CN | 106149276 | 11/2016 |
| CN | 109629169 | 4/2019 |
| EP | 2703536 | 3/2014 |
| EP | 2949803 | 4/2018 |
| EP | 3521501 | 8/2019 |
| JP | S58-173593 | 10/1983 |
| JP | 2018-196724 | 12/2018 |
| KR | 20130027926 | 3/2013 |
| KR | 20180074489 | 7/2018 |
| KR | 10-1921181 | 2/2019 |
| RU | 2401341 | 10/2010 |
| WO | WO 2008013395 | 1/2008 |
| WO | WO 2018221870 | 12/2018 |

OTHER PUBLICATIONS

Office Action in Chinese Appln. No. 202110191449.0, dated Aug. 30, 2022, 15 pages (with English translation).

Office Action in Japanese Appln. No. 2021-02527, dated Mar. 7, 2023, 6 pages (with English translation).

Office Action in Japanese Appln. No. 2021-025273, dated May 10, 2022, 7 pages (with English translation).

RU Office Action in Russian Appln. No. 2021103942, dated Aug. 18, 2021, 6 pages (English translation).

LAUNDRY TREATING APPARATUS

CROSS-REFERENCE TO RELATED APPLICATIONS

This application is a continuation of U.S. application Ser. No. 17/178,887, filed on Feb. 18, 2021, which claims the benefit of Korean Patent Application Nos. 10-2020-0020457, filed on Feb. 19, 2020, 10-2020-0023776, filed on Feb. 26, 2020, 10-2020-0027778, filed on Mar. 5, 2020, 10-2020-0132545, filed on Oct. 14, 2020, and 10-2020-0132544, filed on Oct. 14, 2020, the disclosures of which are hereby incorporated by reference as if fully set forth herein.

TECHNICAL FIELD

The present disclosure relates to a laundry treating apparatus, and relates to a laundry treating apparatus including a first treating apparatus on an upper side and a second treating apparatus on a lower side.

BACKGROUND

A laundry treating apparatus is an apparatus that can receive laundry such as clothes, bedding, and the like into a drum to perform treatment of the laundry to remove contamination from the laundry, to dry the laundry, or to do both.

For example, the laundry treating apparatus may remove the contamination from the laundry by performing processes such as washing, rinsing, dehydration, drying, and the like. The laundry treating apparatuses may be classified into a top loading type laundry treating apparatus and a front loading type laundry treating apparatus based on a scheme of putting the laundry into the drum.

The laundry treating apparatus may include a cabinet defining an external appearance of the laundry treating apparatus, a tub accommodated in the cabinet, a drum that is rotatably mounted inside the tub and configured to receive laundry therein, and a detergent feeder that feeds detergent into the drum.

The drum may be rotated by a motor while wash water is supplied to the laundry accommodated in the drum, and dirt on the laundry may be removed by friction with the drum and the wash water.

The detergent feeder may perform a detergent feeding function to improve a washing effect. For example, the detergent may include a substance, such as fabric detergent, fabric softener, fabric bleach, and the like, that may enhance the washing effect. Detergent in a powder form and detergent in a liquid form may be used as the detergent.

In some cases, the laundry treating apparatus may dry the laundry to remove moisture from the laundry by supplying dry air to the laundry.

The laundry treating apparatus may include a cabinet, a drum rotatably disposed inside the cabinet, heating devices for heating or drying the air supplied to the laundry, and the like.

As the dry air is supplied to the laundry accommodated in the drum, the moisture present in the laundry can be evaporated and removed by the dry air, and water can be removed from the laundry.

In some examples, a laundry treating apparatus may include a plurality of treating apparatuses. For example, the laundry treating apparatus includes a first treating apparatus on an upper side and a second treating apparatus on a lower side. Each of the first treating apparatus and the second treating apparatus includes a manipulation unit and a display.

The plurality of treating apparatuses may be distinguished from each other and include respective manipulation units and respective displays. In some cases, a user may respectively identify states of the respective plurality of treating apparatuses, and respectively manipulate the plurality of treating apparatuses. In some cases, the user may operate the plurality of treating apparatuses in conjunction with each other.

In some examples, the plurality of treating apparatuses may respectively include different electricity consuming devices. In some cases, a short circuit may occur from the electric consuming devices, an electric wire, or the like by other substances such as water, moisture, refrigerant, and the like inside the treating apparatus.

The occurrence of the short circuit in the situation where the plurality of treating apparatuses are arranged may affect not only the corresponding treating apparatus but also the electricity consuming devices disposed inside the treating apparatus.

Therefore, in the laundry treating apparatus including the plurality of treating apparatuses, it may be important to improve convenience of a user in identifying or manipulating operating states of the plurality of treating apparatuses and to prevent an occurrence of malfunction or damage resulted from unintentional electrical connection between the plurality of treating apparatuses.

SUMMARY

The present disclosure describes a laundry treating apparatus including a plurality of treating apparatuses that are effectively electrically insulated from each other and provide a stable coupling relationship with each other.

The present disclosure also describes a laundry treating apparatus including a first treating apparatus disposed on an upper side that can be electrically insulated from and stably supported on a second treating apparatus disposed on a lower side.

The present disclosure further describes a laundry treating apparatus including an insulating portion that is disposed at a portion at which the plurality of treating apparatuses are in contact with and coupled to each other, thereby providing effective electrical insulation.

In some implementations, a laundry treating apparatus can include a plurality of treating apparatuses. For instance, the first treating apparatus can dry laundry, and the second treating apparatus can wash the laundry. In some examples, the first treating apparatus and the second treating apparatus can have a structure stacked together in a vertical direction. For example, the first treating apparatus can be disposed on the second treating apparatus.

Each of the first treating apparatus and the second treating apparatus can have a laundry inlet configured to receive laundry and defined at a front face thereof, and a drum for accommodating therein the laundry inserted into each cabinet through each laundry inlet. In a front loader type apparatus, each of the first treating apparatus and the second treating apparatus can have a shaft configured to rotate about a rotation axis direction extending parallel to a front and rear direction.

In some implementations, the laundry treating apparatus can include a control panel that is operationally or electrically connected to the first treating apparatus and the second treating apparatus and that is disposed between the first treating apparatus and the second treating apparatus. The control panel can define a portion of a front face of the laundry treating apparatus. For example, the control panel can be disposed between a first front panel of the first treating apparatus and a second front panel of the second treating apparatus, so that a front face of the control panel can be exposed forward.

In some examples, in the second treating apparatus, an upper frame disposed on a front face of the second treating apparatus can be coupled to the first treating apparatus. The upper frame can be coupled to a top of the second treating apparatus on the front face of the second treating apparatus, and to a bottom of the first treating apparatus together.

A lower portion of each first side panel can be coupled to the upper frame in the first treating apparatus, and an upper portion of each second side panel can be coupled to the upper frame in the second treating apparatus to be fastened with the first treating apparatus.

The upper frame is coupled to the first treating apparatus through front insulating members, so that the upper frame can provide a structurally stable fastening relationship with the first treating apparatus while being electrically separated from the first treating apparatus.

According to one aspect of the subject matter described in this application, a laundry treating apparatus incudes a first treating apparatus, a second treating apparatus that is disposed vertically below the first treating apparatus and supports the first treating apparatus, and an insulating portion that connects the first treating apparatus and the second treating apparatus to each other. The first treating apparatus includes a first cabinet that defines an external appearance of the first treating apparatus, and a first drum disposed inside the first cabinet and configured to accommodate laundry therein. The second treating apparatus includes a second cabinet that defines an external appearance of the second treating apparatus, and a second drum disposed inside the second cabinet and configured to accommodate laundry therein. The insulating portion includes an insulating material and electrically insulates the first treating apparatus and the second treating apparatus from each other.

Implementations according to this respect can include one or more of the following features. For example, the second treating apparatus can include an upper frame that protrudes upward and is coupled to the first treating apparatus, and the insulating portion can include a front insulating member that is coupled to the upper frame, that connects the upper frame to the first treating apparatus, and that electrically insulates the upper frame and the first treating apparatus from each other. In some examples, the first cabinet can include a first front panel disposed at a front side of the first cabinet, and first side panels disposed at lateral sides of the first cabinet, and the second cabinet can include a second front panel disposed at a front side of the second cabinet, and second side panels disposed at lateral sides of the second cabinet.

In some implementations, the upper frame can include a lower portion coupled to the second side panels at a rear side of the second front panel, and an upper portion coupled to the first side panels at the rear side of the second front panel through the front insulating member. In some examples, the front insulating member can include a first fastening portion coupled to one of the first side panels, and a second fastening portion that is coupled to the upper frame and insulates the upper frame and the one of the first side panels from each other.

In some implementations, the laundry treating apparatus can include a first fastening member that penetrates the first fastening portion and the one of the first side panels and that fastens the first fastening portion and the one of the first side panels to each other, and a second fastening member that penetrates the upper frame and is inserted into the second fastening portion and that fastens the upper frame and the second fastening portion to each other. The second fastening portion can include a fastening insulating portion that extends to and penetrates the one of the first side panels, where the fastening insulating portion insulates the second fastening member and the one of the first side panels from each other, and at least a portion of the second fastening member is inserted into the fastening insulating portion.

In some examples, the second front panel can include an upper fastening portion disposed at an upper portion of the second front panel and coupled to the second cabinet, and the upper frame can be positioned rearward relative to the upper fastening portion and coupled to the first treating apparatus together with the upper fastening portion through the front insulating member.

In some implementations, the insulating portion can include a control panel that is disposed between the first front panel and the second front panel, that connects the first front panel and the second front panel to each other, and that electrically insulates the first front panel and the second front panel from each other. In some examples, the first treating apparatus further can include a lower frame disposed at a rear side of the control panel and coupled to the control panel, and the lower frame is coupled to the first side panels and spaced apart from the upper frame, the lower frame being electrically insulated from the upper frame.

In some implementations, where the first cabinet includes a first front panel disposed at a front side of the first cabinet, and the second cabinet includes a second front panel disposed at a front side of the second cabinet, the insulating portion can include a control panel that is disposed between the first front panel and the second front panel, that connects the first front panel and the second front panel to each other, and that electrical insulates the first front panel and the second front panel from each other. In some examples, the control panel can include a top surface that faces the first front panel and is coupled to the first front panel, and a bottom surface that faces the second front panel and is coupled to the second front panel.

In some implementations, where the first cabinet includes a first rear panel disposed at a rear side of the first cabinet, and the second cabinet includes a second rear panel disposed at a rear side of the second cabinet, the insulating portion can include a rear insulating member that is coupled to the first rear panel and the second rear panel, that connects the first rear panel and the second rear panel to each other, and that electrically insulates the first rear panel and the second rear panel from each. In some examples, the first rear panel is located forward relative to the second rear panel, and the rear insulating member can include an upper portion that supports the first rear panel, and a lower portion that supports the second rear panel and is stepped reward relative to the upper portion.

In some implementations, the insulating portion can include a bottom insulating member disposed at a bottom of the first cabinet and supported upward by the second cabinet, and the second cabinet can support the first cabinet through the bottom insulating member. In some examples, the first cabinet can include first side panels disposed at lateral sides of the first cabinet, and the second cabinet can include second side panels disposed at lateral sides of the second cabinet. Each of the first side panels and each of the second side panels can be spaced apart from each other and insulated from each other by the bottom insulating member.

In some examples, the first cabinet has an open bottom surface, and the bottom insulating member can include a first bottom insulating member that is coupled to the first cabinet and that covers the open bottom surface of the first cabinet. The first side panels can include a bottom coupling portion coupled to the first bottom insulating member, and a bottom extension portion that is positioned downward relative to the bottom coupling portion and covers the bottom coupling portion and at least a portion of the first bottom insulating member in a lateral direction. In some examples, the second cabinet can include a top panel disposed on a top side of the second cabinet, and the first bottom insulating member can include an insulating leg that protrudes toward the top panel of the second cabinet and is supported by the top panel of the second cabinet. The top panel of the second cabinet can define a leg seating groove that supports the insulating leg therein.

In some implementations, the first cabinet can include a first bottom panel disposed at a bottom side of the first cabinet, and the bottom insulating member can include a second bottom insulating member that is coupled to the first bottom panel, that is supported by the second cabinet, and that electrically insulates the first bottom panel from the second cabinet. In some examples, the second bottom insulating member can include an insulating support that is disposed between one of the first side panels and one of the second side panels and that electrically insulates the one of the first side panels and the one of the second side panels from each other. The second side panels can support the first side panels through the insulating support, and the first side panels can include a bottom extension portion that extends downward relative to the first bottom panel and that covers at least a portion of the insulating support in a lateral direction.

In some examples, the second cabinet has an open top surface, and the second bottom insulating member can include an insulating protrusion that protrudes from the first bottom panel, that is inserted into the open top surface of the second cabinet, and that supports the second side panels in the lateral direction.

According to another aspect, a laundry treating apparatus includes a first treating apparatus, a second treating apparatus that is disposed vertically below the first treating apparatus and supports the first treating apparatus, and an insulating portion that connects the first treating apparatus and the second treating apparatus to each other. T first treating apparatus includes a first cabinet that defines an external appearance of the first treating apparatus, and a first drum disposed inside the first cabinet and configured to accommodate laundry therein. The second treating apparatus includes a second cabinet that defines an external appearance of the second treating apparatus, and a second drum disposed inside the second cabinet and configured to accommodate laundry therein. The first cabinet includes a first front panel, first side panels, and a first rear panel, and the second cabinet includes a second front panel, second side panels, and a second rear panel. The insulating portion connects the first front panel, the first side panels, and the first rear panel to the second front panel, the second side panels, and the second rear panel, respectively. In addition, the insulating portion electrically insulates the first front panel, the first side panels, and the first rear panel from the second front panel, the second side panels, and the second rear panel, respectively.

DETAILED DESCRIPTION

Hereinafter, one or more of the present disclosure will be described in detail with reference to the accompanying drawings such that a person having ordinary knowledge in the technical field to which the present disclosure belongs can easily implement the present disclosure.

Figure 1:
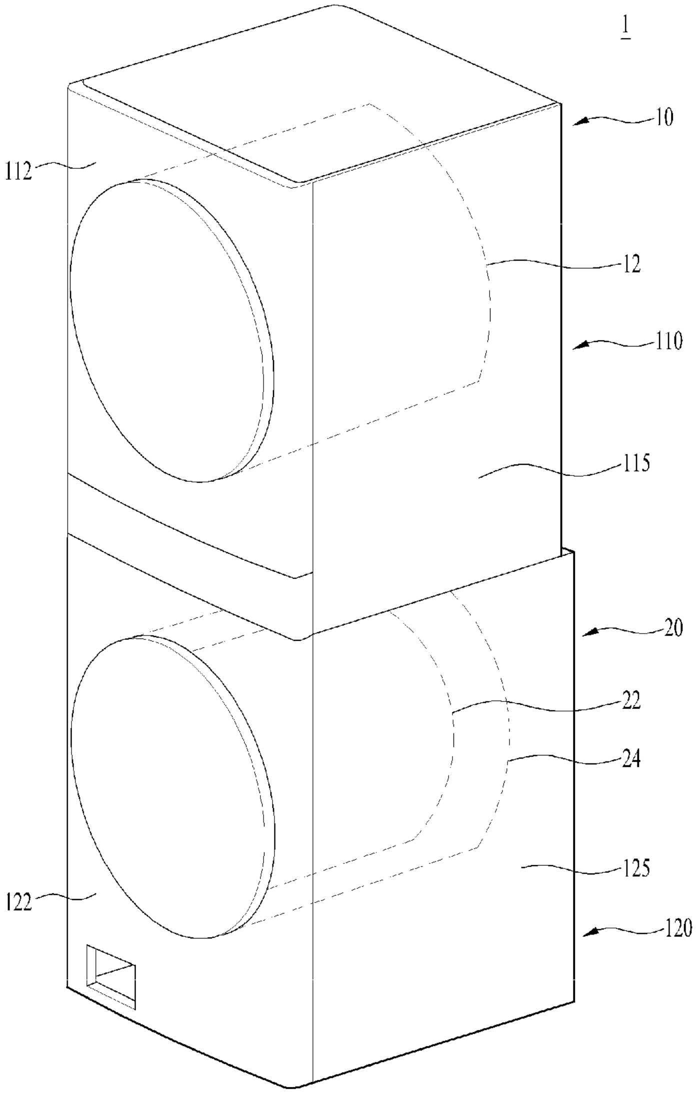
FIG. 1 is a perspective view showing an example of a laundry treating apparatus.

FIG. 1 shows an example of a laundry treating apparatus 1. In some implementations, the laundry treating apparatus 1 can include a first treating apparatus 10 and a second treating apparatus 20. The first treating apparatus 10 and the second treating apparatus 20 can be in various types for treating laundry, such as a washing machine for washing the laundry or a dryer for drying the laundry.

For example, the first treating apparatus 10 positioned on an upper side in FIG. 1, which is a dryer for drying the laundry, can have a first drum 12 disposed therein. The second treating apparatus 20 that is located on a lower side and supports the first treating apparatus 10 can correspond to the washing machine for washing the laundry, and can have a second drum 22 and a tub 24 arranged therein. When the second treating apparatus 20 corresponds to the laundry washing machine, the second drum 22 inside the second treating apparatus 20 can be rotatably disposed inside the tub 24.

In some implementations, the first treating apparatus 10 and the second treating apparatus 20 are not necessarily limited to the above types. When necessary, both the first treating apparatus 10 and the second treating apparatus 20 can be the washing machines or the dryers. In addition, the first treating apparatus 10 can be the washing machine, and the second treating apparatus 20 can be the dryer. The first treating apparatus 10 and the second treating apparatus 20 can be various apparatuses for treating the laundry.

The first treating apparatus 10 can include a first cabinet 110 forming an appearance thereof, and the first cabinet 110 can have a first front panel 112 on a front face thereof. A laundry inlet in communication with the first drum 12 can be defined in the first front panel 112, and the laundry inlet can be opened and closed by a cabinet door.

In addition, the first treating apparatus 10 can have each first side panel 115 on each of both faces thereof in a left and right direction Y, a first rear panel 118 on a rear face thereof, a first top panel on a top face thereof, and a first bottom panel 119 on a bottom face thereof.

The first front panel 112, the first side panels 115, the first rear panel 118, the first top panel, and the first bottom panel 119 can form the first cabinet 110 together, and have a coupling relationship with each other, and define a space in which internals constituting the first treating apparatus 10 such as the first drum 12 are arranged.

In the first treating apparatus 10, the laundry requiring the treatment and the like can be inserted into the first cabinet 110 through the laundry inlet and accommodated in the first drum 12, and a treating process by the first treating apparatus 10 such as washing, drying, and the like can be performed.

FIG. 1 illustrates the first treating apparatus 10 in which the laundry inlet is defined in the first front panel 112 along with the cabinet door, and the first drum 12 has a rotation axis parallel to a front and rear direction X.

In some implementations, the laundry inlet may not be necessarily limited to being defined in the first front panel 112, and can be defined in the first side panel 115, the first top panel, or the like together with the cabinet door. For example, the first treating apparatus 10 can be a front loader type or a top loader type.

In some examples, the second treating apparatus 20 can include a second cabinet 120 forming an appearance thereof, and the second cabinet 120 can have a second front panel 122 on a front face thereof. A laundry inlet in communication with the second drum 22 can be defined in the second front panel 122, and the laundry inlet can be opened and closed by a cabinet door.

In addition, the second treating apparatus 20 can have each second side panel 125 on each of both faces thereof in the left and right direction Y, a second rear panel 128 on a rear face thereof, a second top panel on a top face thereof, and a second bottom panel on a bottom face thereof.

The second front panel 122, the second side panels 125, the second rear panel 128, the second top panel, and the second bottom panel can form the second cabinet 120 together, and have a coupling relationship with each other, and define a space in which internals constituting the second treating apparatus 20 such as the second drum 22 and the tub 24 are arranged.

In the second treating apparatus 20, the laundry requiring the treatment and the like can be inserted into the second cabinet 120 through the laundry inlet and accommodated in the second drum 22, and a treating process by the second treating apparatus 20 such as the washing, the drying, and the like can be performed.

FIG. 1 illustrates the second treating apparatus 20 in which the laundry inlet is defined in the second front panel 122 along with the cabinet door, and the second drum 22 has a rotation axis parallel to the front and rear direction X.

In some implementations, the laundry inlet may not be necessarily limited to being defined in the second front panel 122, and can be defined in the second side panel 125, the second top panel, or the like together with the cabinet door. For example, the first treating apparatus 10 can be the front loader type or the top loader type.

For example, the laundry inserted through the first front panel 112 can be accommodated in the first drum 12 to perform the washing, the drying or other treating processes, and the laundry inserted through the second front panel 122 can be accommodated in the second drum 22 to perform the washing, the drying, or other treating processes.

The first treating apparatus 10 can be disposed on the second treating apparatus 20, and thus, the second treating apparatus 20 can have a structure supporting the first treating apparatus 10 upward. For example, the second top panel of the second treating apparatus 20 can have a structure of directly or indirectly supporting the first bottom panel 119 of the first treating apparatus 10, and a bottom of the first treating apparatus 10 can be coupled with a top of the second treating apparatus 20.

In some implementations, a control panel 200 can be disposed between the first front panel 112 and the second front panel 122. The control panel 200 can be disposed between the first front panel 112 and the second front panel 122, and can be operationally or electrically connected to at least one of the first treating apparatus 10 and the second treating apparatus 20.

The control panel 200 can have a front face 210, and side faces 240 on both sides in the left and right direction Y. The side face 240 can include a first side face 242 on one side in the left and right direction Y and a second side face 244 on the other side.

The control panel 200 can have a top face 220 and a bottom face 230. The front face 210, the side faces 240, the top face 220, and the bottom face 230 can be connected to each other. For example, the side faces 240, the top face 220, and the bottom face 230 can have a shape extending rearward from the front face 210.

The front face 210 of the control panel 200 can be exposed to the outside to form a front face of the laundry treating apparatus 1 together with the first front panel 112 and the second front panel 122. The side face 240 of the control panel 200 can be exposed to the outside in the left and right direction Y, and the top face 220 and the bottom face 230 thereof can be inserted between the first front panel 112 and the second front panel 122 and may not be exposed to the outside.

The control panel 200 can be operationally or electrically connected to at least one of the first treating apparatus 10 and the second treating apparatus 20. The control panel 200 can include a display capable of indicating states of the first treating apparatus 10 and/or the second treating apparatus 20 disposed on the front face 210 thereof, and the first treating apparatus 10, and an input unit capable of inputting operation commands of the first treating apparatus 10 and/or the second treating apparatus 20. The control panel 200 can be a plate or substantially flat shape. In some examples, the control panel 200 can have a curved shape.

Electric parts 224 can be arranged inside the control panel 200, that is, on a rear face of the front face 210. The electric parts 224 can be electrically connected to the first treating apparatus 10 and/or the second treating apparatus 20 and can exchange state information or control signals.

For example, the electric parts 224 can include a controller of the first treating apparatus 10 and a controller of the second treating apparatus 20, can include an integrated controller that controls the first treating apparatus 10 and the second treating apparatus 20 together, can include a panel controller connected to the controller of the first treating apparatus 10 and the controller of the second treating apparatus 20 in a control manner, or can be controlled by the controller of the first treating apparatus 10 and the controller of the second treating apparatus 20 without a separate controller.

The control panel 200 can include a rear face, but in some implementations, the rear face of the control panel 200 can be opened. The control panel 200 disposed between the first front panel 112 and the second front panel 122 can be positioned at a lower portion of the first treating apparatus 10 or at an upper portion of the second treating apparatus 20.

The first front panel 112 can be positioned above the control panel 200, and the second front panel 122 can be positioned below the control panel 200. The control panel 200 can connect the first front panel 112 and the second front panel 122 to each other.

The control panel 200 can be coupled to the first front panel 112 and the second front panel 122 to form an appearance of a front face of the laundry treating apparatus 1. The front face 210 of the control panel 200 can form one face with the first front panel 112 and the second front panel 122.

In some implementations, the control panel 200 can include the front face 210, the top face 220, the bottom face 230, and the like that form an appearance thereof containing an insulating material such as plastic. In other words, the control panel can correspond to an insulator in relation to the outside.

That is, the first front panel 112 and the second front panel 122 can be connected to each other by the control panel 200 and can be electrically insulated from each other by the control panel 200. As will be described below, the control panel 200 can correspond to one component of an insulating portion that electrically insulates the first treating apparatus 10 and the second treating apparatus 20 from each other and connects the first treating apparatus 10 and the second treating apparatus 20 with each other.

In addition, the first front panel 112 and the second front panel 122 can include a metal plate, and an outer face of the control panel 200 can be made of a material having elasticity such as plastic. That is, the control panel 200 can function as a damping member that absorbs or alleviates shock or vibration between the first front panel 112 and the second front panel 122.

Figure 2:
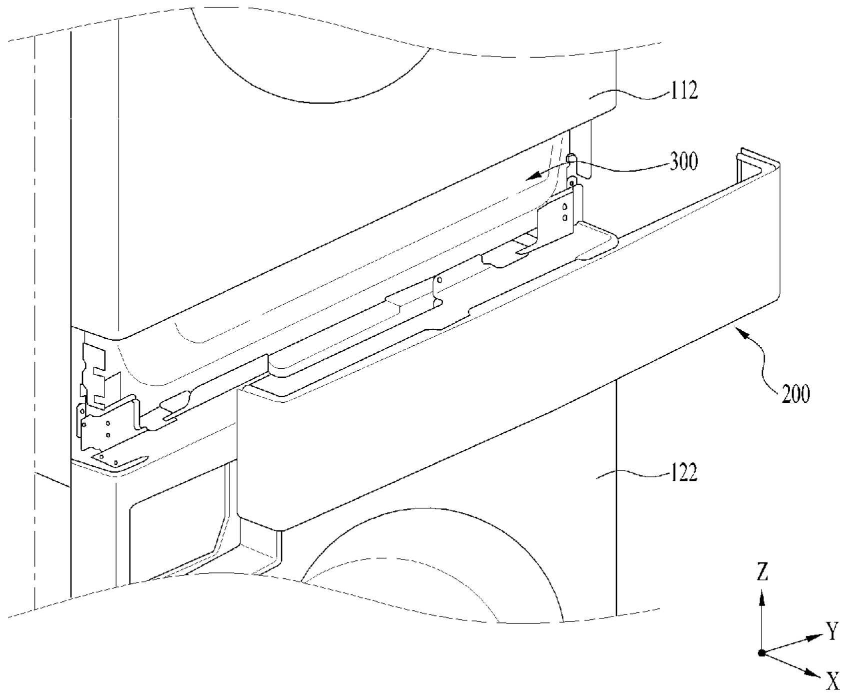
FIG. 2 is a view showing an example of a control panel separated from the laundry treating apparatus.
Figure 3:
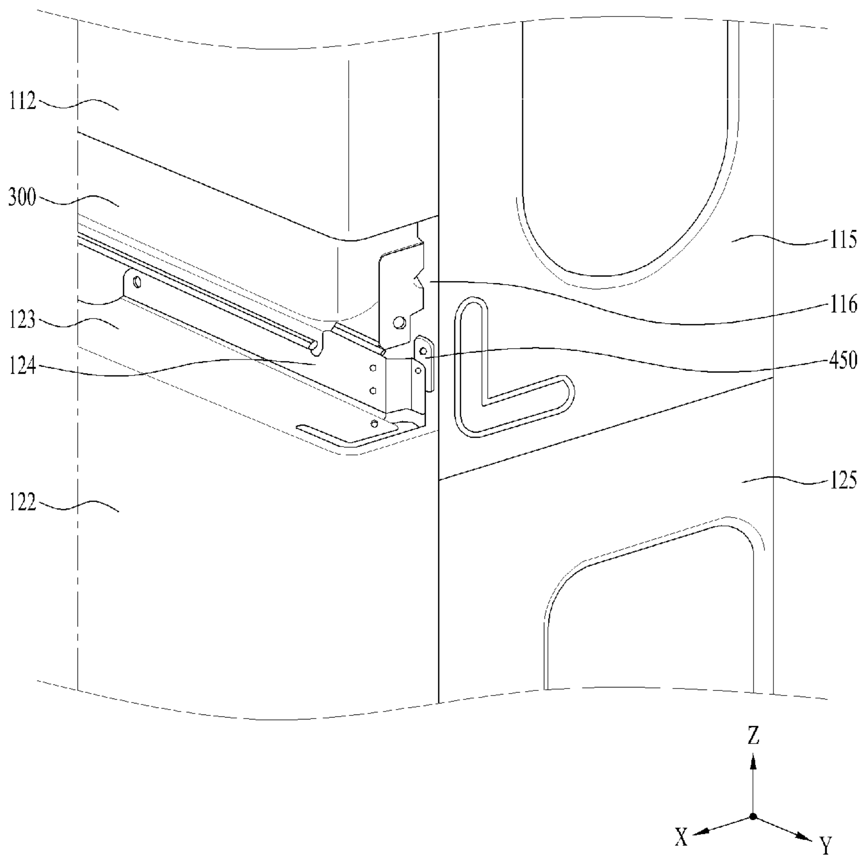
FIG. 3 is a view showing an example of a lower frame coupled to the laundry treating apparatus.
Figure 4:
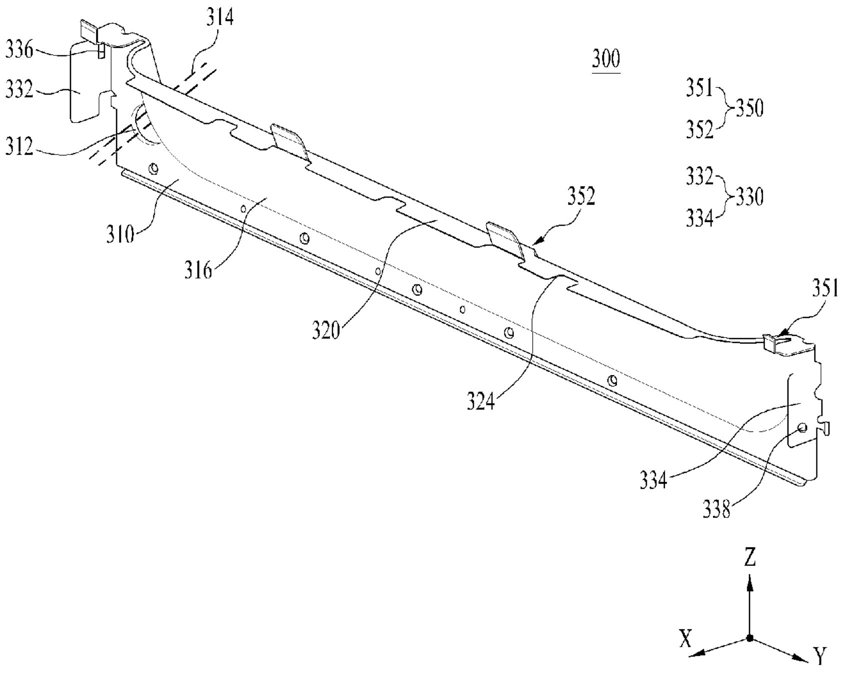
FIG. 4 is a perspective view showing an example of the lower frame.

In some implementations, FIG. 2 is a view showing a state in which the control panel 200 is separated from the laundry treating apparatus 1, FIG. 3 shows a lower frame 300 coupled to a lower portion of the first treating apparatus 10, and FIG. 4 shows a perspective view of the lower frame 300.

As shown in FIGS. 2 to 4, in some implementations, the first treating apparatus 10 can include the lower frame 300. The lower frame 300 can be coupled to the control panel 200 at the rear of the control panel 200 to fix the control panel 200.

The lower frame 300 can be constructed to be coupled to and fix the control panel 200 inserted between the first front panel 112 and the second front panel 122. The lower frame 300 can be disposed beneath the first front panel 112 and can be disposed at the rear of the control panel 200.

The lower frame 300 can be coupled with the control panel 200 while being fixed to the first treating apparatus 10. There can be various schemes of coupling with the control panel 200, and as will be described later, the side face 240 of the control panel 200 can be coupled with side end extensions 330 of the lower frame 300 to fix the control panel 200.

In some implementations, the first treating apparatus 10 and the second treating apparatus 20 are arranged together such that a user can perform an efficient laundry treating process, and one control panel 200 for efficient operation of the first treating apparatus 10 and the second treating apparatus 20 is disposed between the first front panel 112 and the second front panel 122 to improve ease of use.

In addition, as described above, the lower frame 300 disposed at the rear of the control panel 200 is disposed at the lower portion of the first treating apparatus 10 such that the control panel 200 disposed between the first front panel 112 and the second front panel 122 can be stably fixed and used. In addition, the lower frame 300 and the control panel 200 are coupled to each other, so that the control panel 200 can be effectively and stably coupled and fixed.

Referring to FIG. 3, in some implementations, both side faces in the left and right direction Y of the lower frame 300 can be respectively coupled to the first side panels 115 respectively facing toward the both side faces of the lower frame 300.

In the present disclosure, the components can have the front and rear directions X parallel to each other, the left and right directions Y parallel to each other, and the vertical directions Z. For example, the front and rear direction X of the first treating apparatus 10 can be defined identically to the front and rear directions X of the second treating apparatus 20, the control panel 200, the lower frame 300, and the like. In addition, the left and right directions Y and the vertical directions Z can also be defined as in the above scheme.

The both side faces in the left and right direction Y of the lower frame 300 can be respectively coupled to the first side panels 115. The lower frame 300 can be disposed at the lower portion of the front face of the first treating apparatus 10, and the both side faces in the left and right direction Y thereof can respectively face toward the first side panels 115 at the rear of the first side panels 115.

Each first side panel 115 can include a front bending portion 116 extending from a front end thereof as will be described later, and the lower frame 300 can be coupled to the front bending portions 116 of the first side panels 115. As for a coupling scheme, various schemes such as screw coupling, rivet coupling, fitting coupling, and the like can be used.

In some implementations, the lower frame 300 has the both side faces in the left and right direction Y respectively coupled to the first side panels 115, and the control panel 200 disposed at the front is coupled to the lower frame 300, so that the control panel 200 that can be connected with the first treating apparatus 10 and the second treating apparatus 20 between the first front panel 112 and the second front panel 122 can have the stable fixing structure.

In some implementations, referring to FIG. 4, the lower frame 300 can include a main frame face 310. The main frame face 310 extends along the left and right direction Y of the first treating apparatus 10 and can divide an interior of the first treating apparatus 10 from the control panel 200.

Specifically, the main frame face 310 of the lower frame 300 can be disposed in parallel with the front face 210 of the control panel 200. The main frame face 310 can extend in left and right direction Y, so that both ends thereof can be respectively coupled to the first side panels 115.

The main frame face 310 can be disposed between the interior of the first treating apparatus 10 and an interior of the control panel 200 to divide the interior of the first treating apparatus 10 from the interior of the control panel 200. Inside the first treating apparatus 10, various internals can be arranged, and there can be a large amount of water or a high-temperature air current as needed. In a process of using the first treating apparatus 10, unintended leak can occur, or the air current can affect the process.

In some examples, an influence of the water or a temperature change inside the first treating apparatus 10 on the control panel 200 can be minimized or reduced as the lower frame 300 includes the main frame face 310 that divides the control panel 200 from the interior of the first treating apparatus 10.

The main frame face 310 can have various shapes as needed, and as described later, can include a convex portion 316 to secure a space in which the internals of the first treating apparatus 10 are arranged and effectively divide the control panel 200 from the interior of the first treating apparatus 10.

In some implementations, a connection hole 312 through which a signal connection line 314 for operationally or electrically connecting the first treating apparatus 10 with the control panel 200 passes can be defined in the main frame face 310.

The electric parts 224 can be arranged inside the control panel 200, and the electric parts 224 can be connected to a sensor, a motor, the controller of first treating apparatus 10, or the like disposed inside the first treating apparatus 10.

To this end, the signal connection line 314 can extend from the interior of the first treating apparatus 10 to the electric parts 224 of the control panel 200, and signal connection between components of the first treating apparatus 10 and the control panel 200 can be achieved by the signal connection line 314.

In some implementations, the control panel 200 can be fixed by the lower frame 300, and the lower frame 300 can include the main frame face 310 that divides the control panel 200 from the interior of the first treating apparatus 10, so that the connection hole 312 through which the signal connection line 314 can pass can be defined in the main frame face 310.

The signal connection line 314 can have various shapes. For example, the signal connection line 314 can include a connection jack or a connection port, and can be connected to the electric parts 224 through the connection hole 312.

Figure 5:
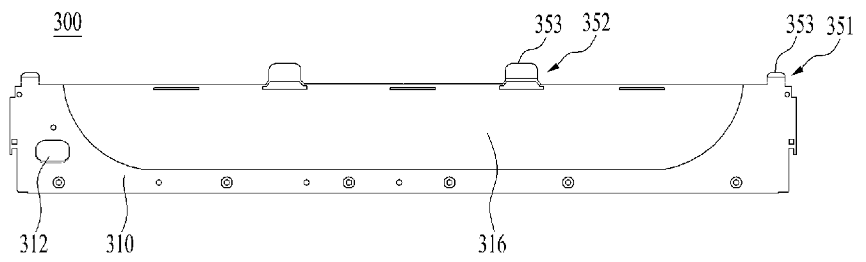
FIG. 5 is a front view showing the lower frame.

There can also be various positions and shapes of the connection hole 312. FIG. 5 is a front view showing the lower frame 300. Referring to FIG. 5, the connection hole 312 can be defined on one side in the left and right direction Y of the main frame face 310, and can be defined on a lower side of said one side such that the signal connection line 314 can be effectively connected to the electric parts 224.

Figure 6:
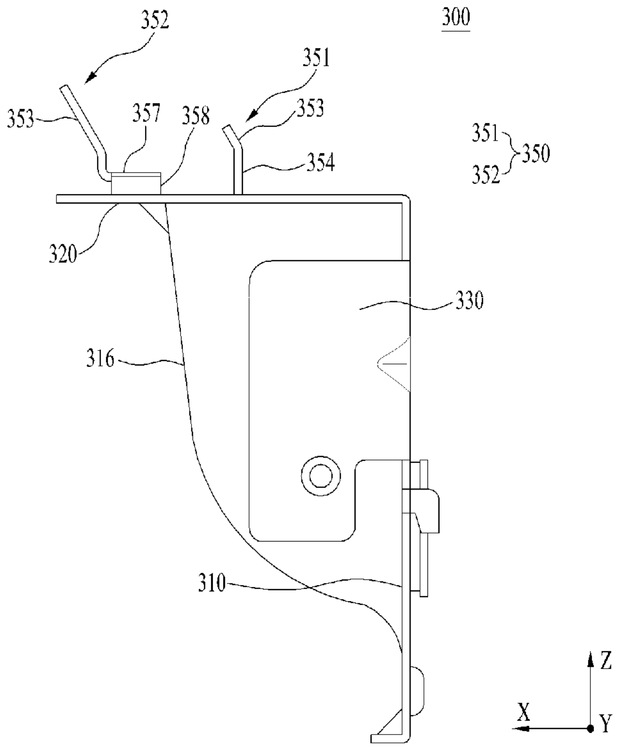
FIG. 6 is a side view showing the lower frame.

In some implementations, FIG. 6 shows a side view of the lower frame 300. Referring to FIGS. 4 to 6, the lower frame 300 can further include an upper end extension 320 and a top coupling portion 350.

The upper end extension 320 can extend forward from an upper end of the main frame face 310, and the top coupling portion 350 can protrude upward from the upper end extension 320 and be coupled to the bottom of the first front panel 112.

The upper end extension 320 can extend forward from the upper end of the main frame face 310 and can be positioned below the first front panel 112. The upper end extension 320 can extend along the left and right direction Y like the main frame face 310, and can extend forward from the main frame face 310.

The top coupling portion 350 can be disposed on the upper end extension 320. The top coupling portion 350 can protrude upward from the upper end extension 320 positioned below the first front panel 112 and can be coupled to the bottom of the first front panel 112.

There can be various numbers, positions, and shapes of the top coupling portion 350 or schemes of coupling with the first front panel 112 as needed. For example, in some implementations, the first front panel 112 can include a lower end bending portion 113, and the top coupling portion 350 can include a panel inserted portion 353 inserted into the lower end bending portion 113.

Specifically, the first front panel 112 can include the lower end bending portion 113 extending rearward from a lower end thereof. The lower end bending portion 113 can be bent at a lower end of a front face of the first front panel 112.

The lower end bending portion 113 can be disposed in parallel with the upper end extension 320, and the top coupling portion 350 can include a panel inserted portion 353 protruding toward the lower end bending portion 113 to penetrate the lower end bending portion 113.

The panel inserted portion 353 can penetrate the lower end bending portion 113 of the first front panel 112 and can be inserted into the bottom of the first front panel 112. The top coupling portion 350 can be coupled to the first front panel 112 as the panel inserted portion 353 penetrates and is inserted into the lower end bending portion 113.

In some implementations, the lower frame 300 is fixed by being coupled with each first side panel 115, fixes the control panel 200 by being coupled to the control panel 200 at the front, is coupled to the first front panel 112 through the upper end extension 320, and supports the first front panel 112, thereby effectively improving structural stability of the laundry treating apparatus 1.

Figure 7:
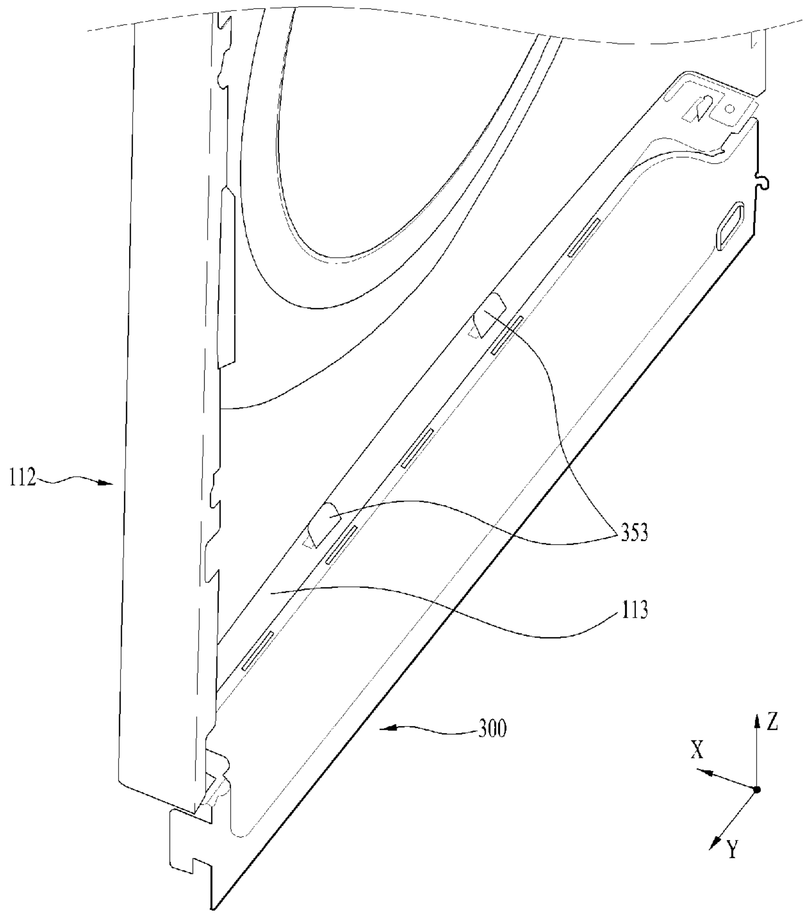
FIG. 7 is a view showing an example of a coupling structure of a first front panel and the lower frame.
Figure 8:
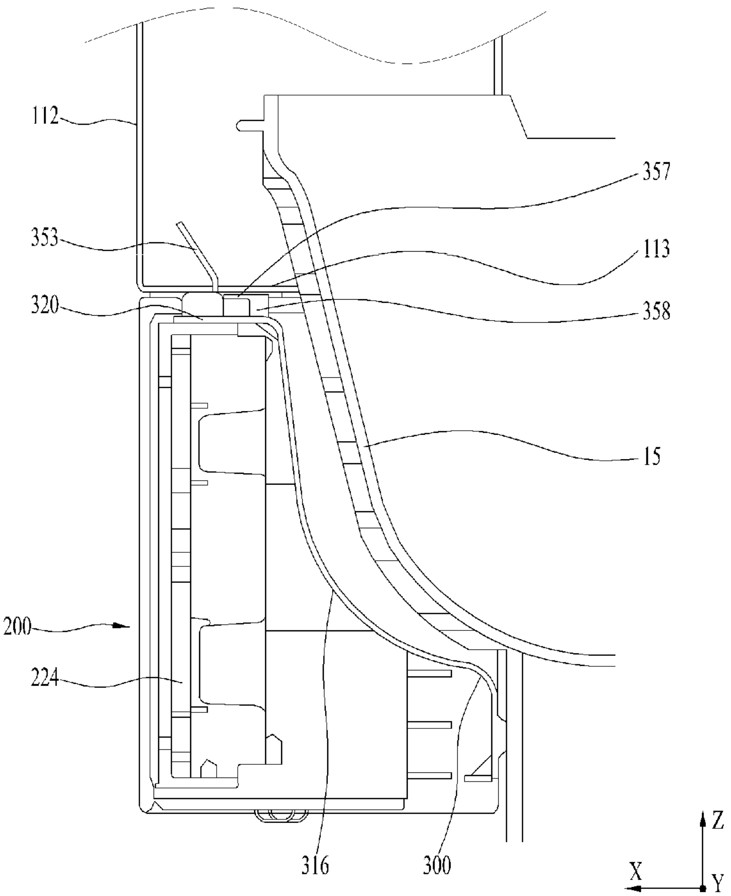
FIG. 8 is a cross-sectional view showing an example state in which the lower frame and a control panel are coupled to each other.

FIG. 7 shows a state in which the panel inserted portion 353 is inserted into the lower end bending portion 113 of the first front panel 112, and FIG. 8 is a cross-sectional view showing a state in which the lower frame 300, the control panel, and the first front panel 112 are coupled to each other.

Referring to FIGS. 6 to 8, in some implementations, at least a portion of the panel inserted portion 353 can extend in an inclined manner such that an upper end thereof is positioned forwardly of a lower end thereof.

That is, the panel inserted portion 353 can be formed to be inclined forward upwardly. An inclined portion of the panel inserted portion 353 can be formed on an entirety of or only a portion of the panel inserted portion 353.

As the panel inserted portion 353 extends in the inclined manner, the upper end thereof is disposed close to the front face of the first treating apparatus 10. Accordingly, the lower end bending portion 113 of the first front panel 112 is moved rearward, so that the panel inserted portion 353 can be easily inserted, and fixation of the first front panel 112 into which the panel inserted portion 353 can be strengthened.

In some implementations, referring to FIGS. 6 and 8, the upper end extension 320 can be spaced downwardly apart from the first front panel 112, and the top coupling portion 350 can further include an ascending extension 354. The ascending extension 354 can extend from the upper end extension 320 toward the lower end bending portion 113. In addition, the panel inserted portion 353 can be disposed at an upper end of the ascending extension 354 to penetrate the lower end bending portion 113.

The first front panel 112, for example, the lower end bending portion 113 of the first front panel 112 and the upper end extension 320 can be spaced apart from each other. The top face 220 of the control panel 200 can be inserted between the upper end extension 320 and the first front panel 112.

The top coupling portion 350 can include the ascending extension 354 extending upward from the upper end extension 320, and the panel inserted portion 353 extending from the ascending extension 354 can be inserted into the first front panel 112.

The top fastening portion can include a first top fastening portion and a second top fastening portion. The ascending extension 354 can be included in the first top fastening portion. That is, in the first top fastening portion, the ascending extension 354 extending from the upper end extension 320 can extend to the lower end bending portion 113 of the first front panel 112, and the panel inserted portion 353 can be disposed on the upper end of the ascending extension 354 and be inserted into the first front panel 112 through the lower end bending portion 113.

There can be various shapes or extension directions of the ascending extension 354, and FIG. 4 shows the plate-shaped panel inserted portion 353 extending in an inclined manner forward from the upper end of the plate-shaped ascending extension 354.

In some implementations, the top coupling portion 350 can include a top support 356, and the panel inserted portion 353 can be disposed on the top support 356. For example, the top coupling portion 350 can include a second top coupling portion 352, the second top coupling portion 352 can include the top support 356, and the panel inserted portion 353 can be disposed on the top support 356.

Specifically, the top support 356 can be disposed on the upper end extension 320 and support the lower end bending portion 113. That is, the top support 356 can be constructed such that an upper end thereof is in contact with the lower end bending portion 113 and supports the lower end bending portion 113 upward.

The top support 356 can have a face for supporting the lower end bending portion 113 or can be formed in a protrusion shape to be in contact with the lower end bending portion 113.

When the top support 356 is disposed on the top coupling portion 350, for example, in a case of the second top coupling portion 352 including the top support 356, the panel inserted portion 353 can be disposed on the top support 356 to penetrate the lower end bending portion 113.

That is, the second top coupling portion 352 can be disposed such that the top support 356 is in contact with the lower end bending portion 113 on the upper end extension 320, and the panel inserted portion 353 can be disposed to protrude upward from the top support 356 to penetrate the lower end bending portion 113.

In some implementations, the top coupling portion 350 is constructed to include the top support 356 supporting the lower end bending portion 113, so that the bottom of the first front panel 112 can be supported upward by the lower frame 300 and can be structurally stabilized.

In some implementations, as shown in FIG. 6, the top support 356 can include a top support face 357 that is spaced upwardly from the upper end extension 320, and is disposed to be in parallel with the lower end bending portion 113 and supports the lower end bending portion 113, and the panel inserted portion 353 can extend from the top support face 357.

The top support face 357 can be disposed to be in parallel with the lower end bending portion 113, and can be disposed to be in parallel with the upper end extension 320. That is, the top support face 357 can be in a form offset upward from the upper end extension 320.

The top support face 357 can be preferably in a face-contact with a bottom face of the lower end bending portion 113 to support the first front panel 112.

In some implementations, the top support 356 can further include a top connection portion 358 connecting the top support face 357 and the upper end extension 320 with each other, and the panel inserted portion 353 can be disposed on a front end of the top support face 357 and at least partially extend in an inclined manner such that an upper end thereof is positioned forward of a lower end thereof.

The top support face 357 can be formed in a plate shape and can be disposed in parallel with the lower end bending portion 113, and can have a connection relationship with the upper end extension 320 by the top connection portion 358. That is, in the top support 356, the top support face 357 can be connected to the upper end extension 320 by the top connection portion 358.

The top connection portion 358 can be formed in various shapes. FIGS. 5 to 6 show that the top connection portion 358 is formed in a substantially plate shape and extends from one edge of the top support face 357 toward the upper end extension 320.

In some implementations, in a case of the second top coupling portion 352 having the top support 356, the panel inserted portion 353 can extend upward from the front end, that is, a front edge, of the top support face 357. Accordingly, the first front panel 112 can be supported on the top support face 357 while being moved rearward on the top of the lower frame 300, and the panel inserted portion 353 can penetrate and be coupled to the lower end bending portion 113.

In addition, the top connection portion 358 can be formed at both side edges and a rear edge of the top support face 357 to stably fix the top support face 357 to the upper end extension 320.

In some implementations, the top coupling portion 350 includes a first top coupling portion 351 having the ascending extension 354 and coupled to the first front panel 112, and a second top coupling portion 352 that supports and fixes the first front panel 112, so that a coupling strength and a support strength between the first front panel 112 and the lower frame 300 can be efficiently determined. The numbers and positions of the first top coupling portion 351 and the second top coupling portion 352 can be variously determined as needed.

FIG. 4 shows that each first top coupling portions 351 is disposed on each of both sides in the left and right direction Y of the upper end extension 320, and second top coupling portions 352 are arranged at a center of the upper end extension 320.

Figure 9:
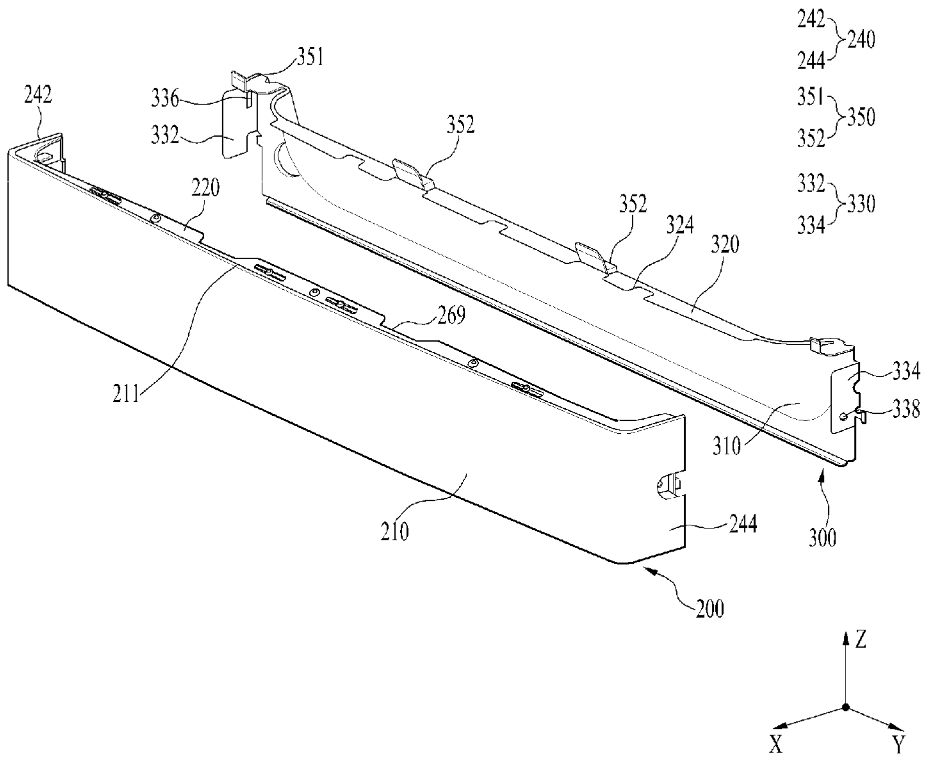
FIG. 9 is a view showing the control panel and the lower frame.
Figure 10:
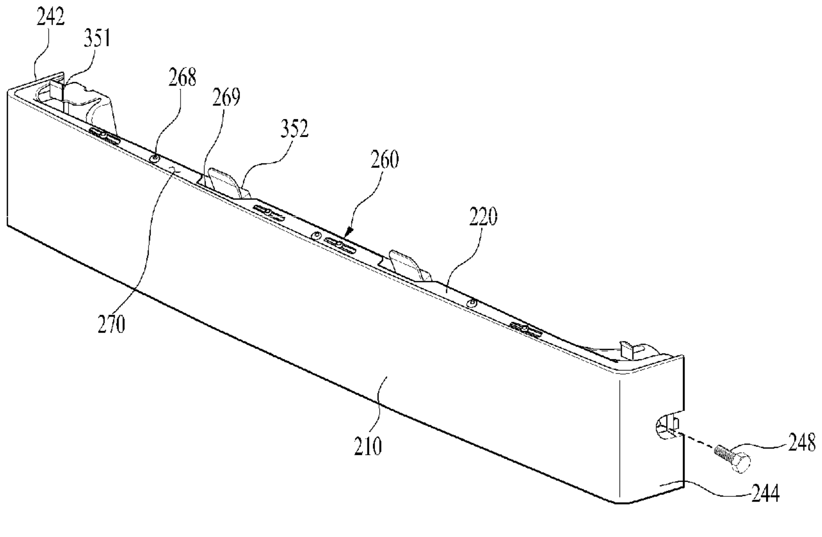
FIG. 10 is a view showing the control panel coupled to the lower frame.

In some implementations, FIG. 9 shows a state of the control panel 200 separated from the lower frame 300 forward, and FIG. 10 shows a state in which the lower frame 300 and the control panel 200 of FIG. 9 are coupled to each other.

Referring to FIGS. 9 and 10, in the laundry treating apparatus 1, the lower frame 300 can include the side end extensions 330, and the side end extensions 330 can respectively extend forward from both sides of the lower frame 300 to be coupled to the control panel 200.

As described above, the lower frame 300 has the main frame face 310 that divides the control panel 200 from the interior of the first treating apparatus 10, and can include the upper end extension 320 to support and fix the bottom of the first front panel 112.

In some examples, the side end extensions 330 respectively extend forward from both sides in the left and right direction Y of the main frame face 310, so that the lower frame 300 can be coupled with the first front panel 112 upward, and at the same time, can be coupled with the control panel 200 in the front through the side end extensions 330, thereby enabling efficient space utilization and realizing a coupling structure.

The side end extension 330 can include a first side end extension 332 disposed on one side in the left and right direction Y of the lower frame 300 and a second side end extension 334 disposed on the other side in the left and right direction Y of the lower frame 300.

In addition, the first side end extension 332 can include a hook inserting portion 336 into which a side face hook 246 disposed on the control panel 200 is inserted, and the second side end extension 334 can include a through hole 338 coupled with a penetrating member 248 penetrating the control panel 200.

Figure 11:
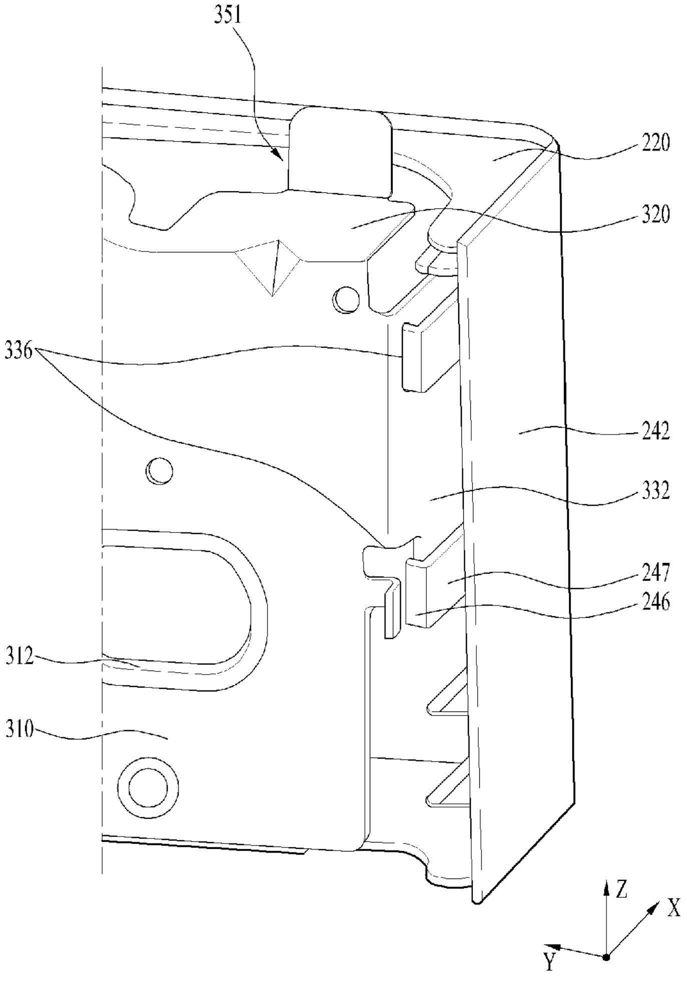
FIG. 11 is a view showing an example of a side face hook of the control panel.

FIG. 9 shows the second side end extension 334 including the through hole 338 to which the penetrating member 248 is coupled, and FIG. 11 is a view of the first side end extension 332 including the hook inserting portion 336 viewed from the rear.

The first side end extension 332 includes the hook inserting portion 336 into which the side face hook 246 disposed on the control panel 200 is inserted. The control panel 200 can include a first side face 242 on one side in the left and right direction Y, and can include the side face hook 246 disposed inside the first side face 242.

Specifically, the first side end extension 332 can be disposed on one side in the left and right direction Y of the main frame face 310 to face toward an inner face of the first side face 242, and the side face hook 246 can be disposed between the first side face 242 and the first side end extension 332.

The side face hook 246 can protrude toward the first side end extension 332 and be inserted into the hook inserting portion 336 of the first side end extension 332, so that the control panel 200 can be fixed to the lower frame 300.

The side face hook 246 can protrude from one side in the left and right direction Y of the control panel 200 toward the other side and can be inserted into the first side end extension 332 of the lower frame 300.

Figure 13:
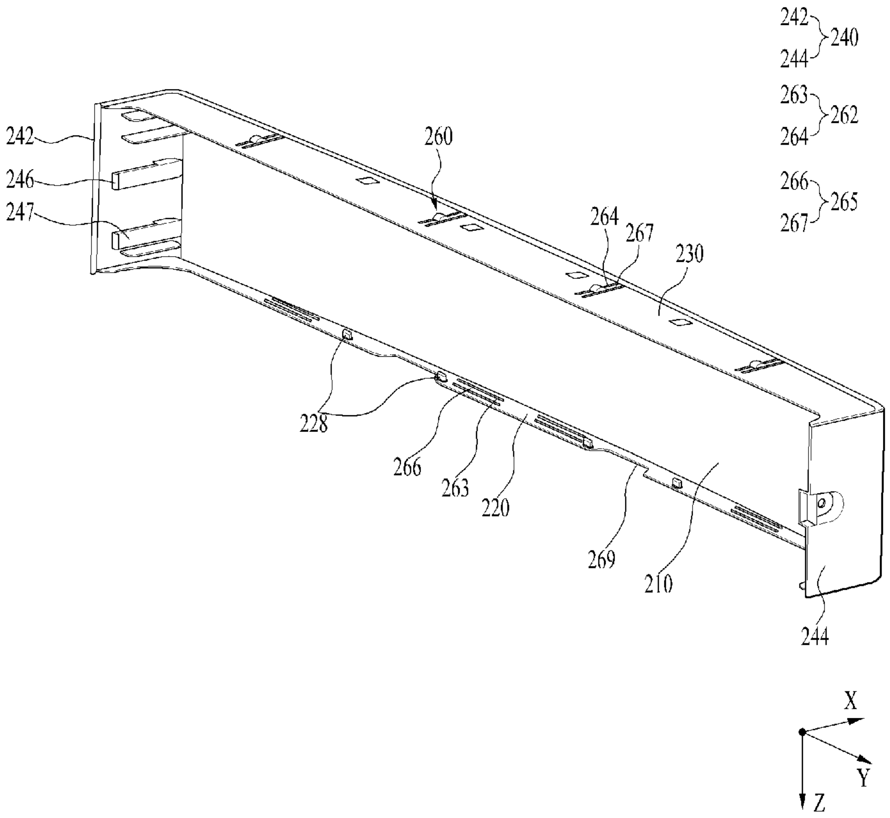
FIG. 13 is a perspective rear view showing the control panel.

In some implementations, the control panel 200 can further include a hook extension 247. FIG. 13 shows the hook extension 247 and the side face hook 246 arranged on an inner face of the first side face 242 of the control panel 200.

The hook extension 247 can extend rearward from the front face 210, can be located between the first side face 242 and the first side end extension 332, can be spaced apart from the first side face 242, and can have the side face hook 246 at an extended end thereof.

The hook extension 247 can extend rearward from the rear face of the front face 210 of the control panel 200, and can be spaced apart from the inner face of the first side face 242, that is, one face of the first side face 242 facing toward the other side in the left and right direction Y of the control panel 200.

As the side face hook 246 and the hook extension 247 are arranged between the first side face 242 of the control panel 200 and the first side end extension 332 of the lower frame 300, and as the side face hook 246 is disposed on an end of the hook extension 247 spaced apart from the first side face 242, in an insertion process of the control panel 200, the hook extension 247 can be bent and deformed as needed such that the side face hook 246 is inserted into the hook inserting portion 336.

For example, when the hook extension 247 is in close contact with the first side face 242 or when the side face hook 246 is disposed on the inner face of the first side face 242, in the insertion process of the control panel 200, the first side face 242 itself of the control panel 200 deforms in a process in which the side face hook 246 reaches the hook inserting portion 336 of the first side end extension 332, resulting in inconvenience in the coupling or a damage.

In some implementations, as the side face hook 246 is disposed on the hook extension 247 spaced apart from the first side face 242, in the process of coupling the control panel 200 and the lower frame 300 with each other, the hook extension 247 is partially bent and the side face hook 246 is moved toward the hook inserting portion 336, so that effective coupling can be achieved.

In some implementations, the control panel 200 can have the second side face 244 disposed on the other side in the left and right direction Y, and the side end extension 330 can further include the second side end extension 334. The second side end extension 334 can be disposed on the other side in the left and right direction Y of the main frame face 310 to face toward the inner face of the second side face 244.

The second side face 244 of the control panel 200 can be penetrated by the penetrating member 248, and the second side end extension 334 of the lower frame 300 positioned on the inner face of the second side face 244 can include the through hole 338 into which the penetrating member 248 is coupled.

The through hole 338 can be penetrated by the penetrating member 248 like the second side face 244, or can be coupled to the penetrating member 248 as the penetrating member 248 penetrated the second side face 244 is inserted thereto. The penetrating member 248 can have various shapes such as a screw shape, a rivet shape, or the like.

In some implementations, the first side end extension 332 of the lower frame 300 is coupled with the first side face 242 of the control panel 200 through the hook inserting portion 336, and the second side end extension 334 of the lower frame 300 is coupled with the second side face 244 of the control panel 200 through the through hole 338, so that assembly efficiency can be improved and a structure having excellent coupling stability can be implemented.

For example, when both the first side end extension 332 and the second side end extension 334 of the lower frame 300 are coupled with the control panel 200 in a hook manner through the hook inserting portion 336, compared to the coupling using the penetrating member 248, the coupling stability can be lower, and it can be disadvantageous in separating the control panel 200 when necessary.

In addition, when both the first side end extension 332 and the second side end extension 334 of the lower frame 300 are coupled with the control panel 200 using the penetrating member 248, there is no means for the control panel 200 to be fixed at an appropriate position to be coupled with the lower frame 300, and a process and a component required for the assembly process are added, which can be disadvantageous.

Accordingly, in some implementations, the first side face 242 of the control panel 200 and the first side end extension 332 of the lower frame 300 are coupled with each other through the side face hook 246 and the hook inserting portions 336, so that the position of the control panel 200 at the beginning of the coupling of the control panel 200 can be effectively fixed.

In addition, the second side face 244 of the control panel 200 and the second side end extension 334 of the lower frame 300 are coupled with each other through the penetrating member 248 and the through hole 338 in a penetrating manner, so that a stable coupling structure in which coupling and separation are easy can be maintained.

Referring again to FIGS. 4 to 8, in some implementations, the main frame face 310 of the lower frame 300 can include the convex portion 316 that is curved such that a front face of the convex portion 316 is convex and a rear face of the convex portion 316 is concave to define a space at the rear.

The convex portion 316 can have a shape extending along the left and right direction Y of the lower frame 300 so as to be parallel with a longitudinal direction of the main frame face 310. In addition, as the front face of the convex portion 316 is convex and the rear face thereof is concave, the space is secured at the rear, so that the convex portion 316 and the components inside the first treating apparatus 10 do not interfere with each other.

FIG. 8 shows a state in which a base cabinet 15 of the first treating apparatus 10 is disposed at the rear of the main frame face 310 of the lower frame 300.

FIG. 8 shows that the convex portion 316 of the main frame face 310 is curved so as to correspond to the base cabinet 15, so that a space in which the base cabinet 15 is disposed is secured without interference between the base cabinet 15 located at the rear of the convex portion 316 and the lower frame 300.

The base cabinet 15 can be disposed on the first bottom panel 119 of the first treating apparatus 10. The base cabinet 15 can be formed integrally with the first bottom panel 119, or can be formed separately from the first bottom panel 119 and disposed on the first bottom panel 119.

The convex portion 316 can be formed to include the top of the main frame face 310, and the upper end extension 320 can extend from the convex portion 316. That is, the convex portion 316 can have a shape in which the space defined at the rear is opened upward.

The convex portion 316 can extend downward from the upper end of the main frame face 310 and can extend along the left and right direction Y. The connection hole 312 can be defined in the convex portion 316 or can be positioned avoiding the convex portion 316.

Because the lower frame 300 has the shape in which the convex portion 316 is formed on the top of the main frame face 310 and the space defined at the rear is opened upward, a space in which the base cabinet 15 and the like that can be positioned at the rear of the lower frame 300 can be effectively secured, and a support strength of the first front panel 112 supported by the upper end extension 320 can be effectively improved.

Figure 12:
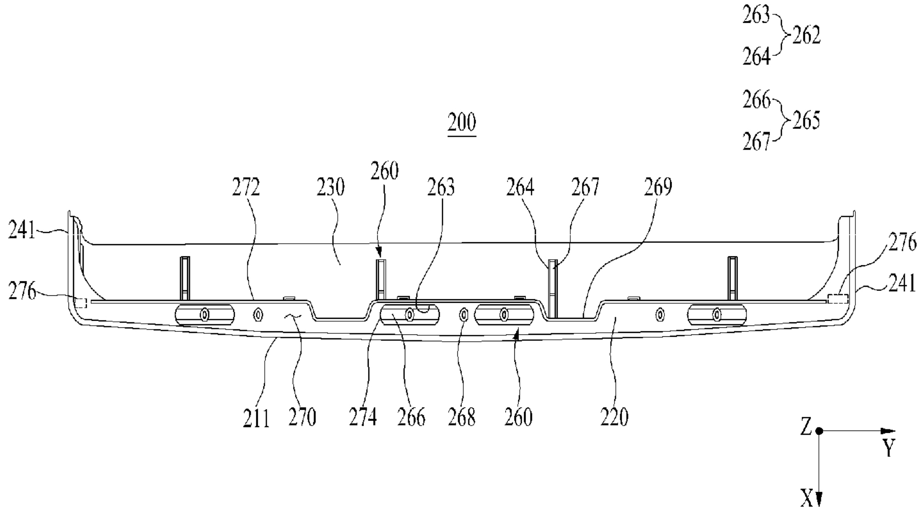
FIG. 12 is a top view showing the control panel.
Figure 14:
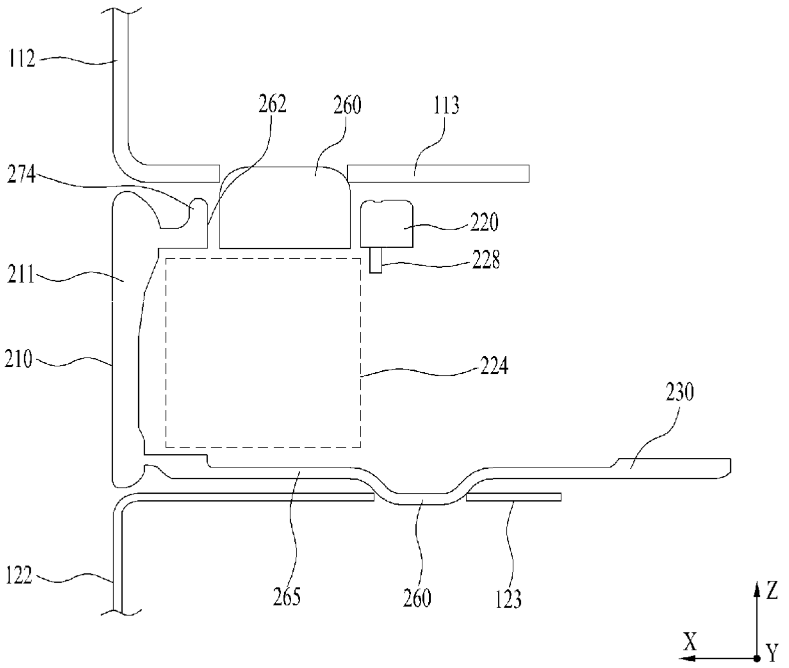
FIG. 14 is a cross-sectional view showing an example of a coupling structure of the control panel and first and second front face panels.

In some implementations, FIG. 12 shows a view of the control panel 200 viewed from the top, FIG. 13 shows a view of the bottom face 230 of the control panel 200 viewed from the rear, and FIG. 14 shows a cross-section of the control panel 200 coupled to the first front panel 112 and the second front panel 122.

Referring to FIGS. 12 to 14, in the laundry treating apparatus 1, the control panel 200 can be fixed as the top thereof is coupled to the bottom of the first front panel 112 and the bottom thereof is coupled to a top of the second front panel 122.

For example, in the control panel 200, the top face 220 can be coupled to the bottom of the first front panel 112, and the bottom face 230 of the control panel 200 can be coupled to the top of the second front panel 122. As described above, the control panel 200 can form the stable coupling structure as the side faces 240 are coupled to the lower frame 300, and at the same time, the top face 220 and the bottom face 230 are respectively coupled to the first front panel 112 and the second front panel 122.

The control panel 200 can be coupled with the first front panel 112 and the second front panel 122 in various schemes. For example, the control panel 200 in front of the lower frame 300 can move rearward to be inserted between the first front panel 112 and the second front panel 122. In the insertion process of the control panel 200, panel fastening portions 260 that can be arranged on the top face 220 and the bottom face 230 can be respectively coupled to the first front panel 112 and the second front panel 122 as will be described later.

Referring to FIG. 14, in some implementations, the second front panel 122 can include an upper end bending portion 123 extending rearward from an upper end of a front face of the second front panel 122. The upper end bending portion 123 can be bent from the front face of the second front panel 122.

The top of the control panel 200 can be coupled to the lower end bending portion 113 of the first front panel 112, and the bottom of the control panel 200 can be coupled to the upper end bending portion 123 of the second front panel 122. Specifically, the control panel 200 inserted between the first front panel 112 and the second front panel 122 is constructed such that the top thereof, that is, the top face 220 faces toward the lower end bending portion 113 of the first front panel 112, and the bottom thereof, that is, the bottom face 230 faces toward the upper end bending portion 123 of the second front panel 122.

The top face 220 of the control panel 200 can be disposed in parallel with the lower end bending portion 113 of the first front panel 112, and the bottom face 230 of the control panel 200 can be disposed in parallel with the upper end bending portion 123 of the second front panel 122. Furthermore, the lower end bending portion 113 of the first front panel 112 and the upper end bending portion 123 of the second front panel 122 can also be arranged to be in parallel with each other.

In the insertion process of the control panel 200, the top face 220 disposed at the top of the control panel 200 can be coupled to the lower end bending portion 113 of the first front panel 112, and the bottom face 230 disposed at the bottom of the control panel 200 can be coupled to the upper end bending portion 123 of the second front panel 122.

In some implementations, FIG. 12 shows the panel fastening portion 260 disposed on the top face 220 of the control panel 200, and FIG. 13 shows the panel fastening portion 260 disposed on the bottom face 230 of the control panel 200. Referring to FIGS. 12 and 13, the top face 220 and the bottom face 230 can include the panel fastening portions 260 respectively inserted into and coupled to the lower end bending portion 113 and the upper end bending portion 123 respectively facing thereto.

The panel fastening portion 260 can be formed in a hook shape and be coupled to the lower end bending portion 113 or the upper end bending portion 123, or can be formed in a protrusion shape and be inserted into and coupled to the lower end bending portion 113 or the upper end bending portion 123.

FIGS. 12 and 13 show the panel fastening portions 260 that are respectively inserted into and coupled to the lower end bending portion 113 of the first front panel 112 and the upper end bending portion 123 of the second front panel 122 as shown in FIG. 14. The number, a position, and a shape of the panel fastening portion 260 can be various as needed.

In some implementations, each of the top face 220 and the bottom face 230 can include an opening 262 open in the vertical direction Z and a fastening elastic portion 265 extending from an inner face of the opening 262 to intersect the opening 262. The panel fastening portion 260 of each of the top face 220 and the bottom face 230 can be disposed on the fastening elastic portion 265.

Specifically, a top face opening 263 can be defined in the top face 220 and a bottom face opening 264 can be defined in the bottom face 230. Each of the top face opening 263 and the bottom face opening 264 can have a shape open in the vertical direction Z and can penetrate each of the top face 220 and the bottom face 230.

The fastening elastic portion 265 can include a top face fastening elastic portion 266 disposed on the top face 220 and a bottom face fastening elastic portion 267 disposed on the bottom face 230. The top face fastening elastic portion 266 can be disposed to intersect the top face opening 263 of the top face 220, and the bottom face fastening elastic portion 267 can be disposed to intersect the bottom face opening 264 of the bottom face 230.

The fastening elastic portion 265 can extend in parallel with the top face 220 or the bottom face 230 from the inner face of each opening 262. For example, the fastening elastic portion 265 can extend from one side of the inner face of the opening 262 and can be connected to the other side of the inner face of the opening 262.

That is, the fastening elastic portion 265 can be disposed on the opening 262. Both ends of the fastening elastic portion 265 are connected to the top face 220 or the bottom face 230 of the control panel 200 in a longitudinal direction, and the remaining portion thereof is separated from the top face 220 or the bottom face 230.

Each opening 262 can have a shape extending in parallel with the longitudinal direction of the fastening elastic portion 265, and can be at least partially shielded in the vertical direction Z by the fastening elastic portion 265.

For example, the fastening elastic portion 265 can be formed by cutting both sides thereof from the top face 220 or the bottom face 230 along the longitudinal direction of the fastening elastic portion 265. Accordingly, the both ends of the fastening elastic portion 265 connected to the inner face of the opening 262 are fixed, so that a center of the fastening elastic portion 265 can be separated from the top face 220 or the bottom face 230 and be elastically deformed.

In some implementations, as the panel fastening portion 260 is disposed on the fastening elastic portion 265, in the insertion process of the control panel 200, the fastening elastic portion 265 is deformed in a process in which each panel fastening portion 260 is moved toward the lower end bending portion 113 of the first front panel 112 or the upper end bending portion 123 of the second front panel 122, and the fastening elastic portion 265 is restored as the panel fastening portion 260 reaches each coupling point, so that the coupling structure can be formed.

FIG. 12 shows the top face opening 263 and the top face fastening elastic portion 266 respectively defined in and disposed on the top face 220 of the control panel 200, and FIG. 13 shows the bottom face opening 264 and the bottom face fastening elastic portion 267 respectively defined in and disposed on the bottom face 230 of the control panel 200.

Figure 15:
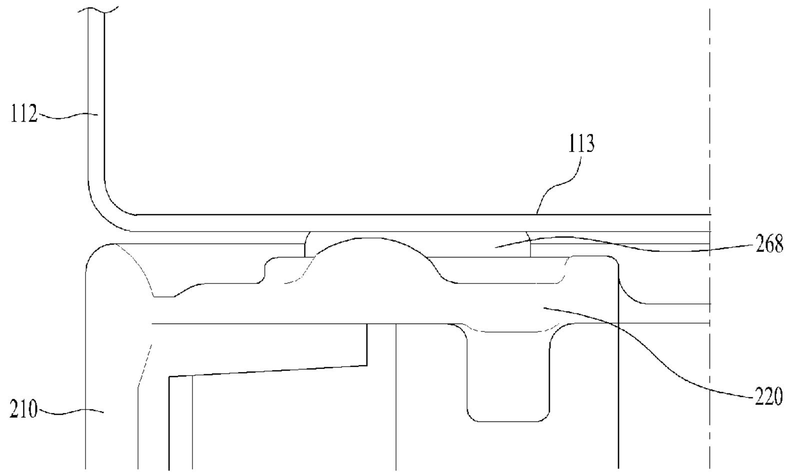
FIG. 15 is a view showing an example of a panel support of the control panel.

In some implementations, FIG. 12 shows a panel support 268 disposed on the top face 220 of the control panel 200, and FIG. 15 shows the panel support 268 supporting the lower end bending portion 113 of the first front panel 112 from below.

Specifically, the panel support 268 can be distinguished from the panel fastening portion 260, and an upper end of the panel support 268 can upwardly support the lower end bending portion 113 of the first front panel 112. The number and a shape of the panel supports 268 can be various, and the panel support 268 can have a top face in parallel with the lower end bending portion 113.

The panel support 268 can protrude upward from the top face 220 of the control panel 200 like the panel fastening portion 260. In some examples, unlike the panel fastening portion 260 inserted into the lower end bending portion 113, the panel support 268 can be in contact with the bottom face of the lower end bending portion 113 to support the lower end bending portion 113. The panel support 268 can have a protrusion shape like the panel fastening portion 260.

In some implementations, as the panel support 268 supporting the bottom of the first front panel 112 is disposed on the top face 220 of the control panel 200, the first front panel 112 can be stably supported. Furthermore, because the panel support 268 of the control panel 200 supports the first front panel 112 together with the top support 356 of the lower frame 300, structural stability can be improved.

In some implementations, the panel fastening portion 260 can have a protrusion height greater than that of the panel support 268. Accordingly, an entirety of the lower end bending portion 113 can have a flat face, and a shape in which the panel fastening portion 260 is inserted into the lower end bending portion 113 of the first front panel 112, and the panel support 268 supports the lower end bending portion 113 can be realized.

Referring again to FIGS. 9 and 10, in some implementations, the top face 220 of the control panel 200 can have a coupling portion receiving groove 269 into which the top coupling portion 350 of the lower frame 300 is inserted and received.

In some implementations, the top face 220 of the control panel 200 can be inserted between the lower end bending portion 113 and the upper end extension 320, and as described above, the upper end extension 320 can include the top coupling portion 350 protruding upward and inserted into the lower end bending portion 113.

In addition, the top face 220 can include the coupling portion receiving groove 269 that is opened rearward, and the top coupling portion 350 is inserted into the coupling portion receiving groove 269 from the rear.

The coupling portion receiving groove 269 can have a shape extending in the front and rear direction X in consideration of an insertion direction of the control panel 200, and a width of the coupling portion receiving groove 269 can be greater than that of the top coupling portion 350. A rear end of the coupling portion receiving groove 269 can be disposed to face toward the top coupling portion 350 and opened rearward, so that the top coupling portion 350 can be inserted into the coupling portion receiving groove 269 through the open rear end of the coupling portion receiving groove 269.

That is, in the process in which the control panel 200 in front of the lower frame 300 is moved rearward and inserted, the top coupling portion 350 of the lower frame 300 can move forward from the rear of the coupling portion receiving groove 269 and be inserted into the coupling portion receiving groove 269.

Accordingly, the upper end extension 320 having the top coupling portion 350 coupled to the first front panel 112 and supporting the first front panel 112 is included in the lower frame 300. In the structure in which the top face 220 of the control panel 200 is inserted between the upper end extension 320 and the lower end bending portion 113 of the first front panel 112, the top coupling portion 350 protruding from the upper end extension 320 of the lower frame 300 toward the lower end bending portion 113 can be positioned without structural interference by the coupling portion receiving groove 269. In addition, the top face 220 of the control panel 200 can also be inserted between the first front panel 112 and the upper end extension 320 of the lower frame 300 without interference by the top coupling portion 350.

In some implementations, FIG. 13 shows an electric parts coupling portion 228 protruding downward from the inner face of the top face 220 of the control panel 200, and FIG. 14 schematically shows the electric parts 224 and the electric parts coupling portion 228.

Referring to FIGS. 13 and 14, in some implementations, the control panel 200 can further include the electric parts 224 and the electric parts coupling portion 228, and the upper end extension 320 of the lower frame 300 can include a front receiving groove 324 into which the electric parts coupling portion 228 is inserted and received.

The electric parts coupling portion 228 can protrude downward from the inner face of the top face 220 and can be coupled to the electric parts 224 inside the control panel 200. The electric parts coupling portion 228 can include a plurality of electric parts coupling portions. The electric parts coupling portion 228 can have a protrusion shape as shown in FIG. 13 and be inserted into and coupled to a groove defined in the electric parts 224, or can be disposed rearward of a rear face of the electric parts 224 and support the rear face of the electric parts 224 as shown in FIG. 14.

In some implementations, the upper end extension 320 of the lower frame 300 can be located below the top face 220 of the control panel 200, and thus, in the insertion process of the control panel 200, the electric parts coupling portion 228 can be in contact with a front end of the upper end extension 320 and interfere with the movement of the control panel 200.

Accordingly, in some implementations, the front receiving groove 324 into which the electric parts coupling portion 228 is inserted and received can be defined at the front end of the upper end extension 320.

The front receiving groove 324 can be defined to face toward the electric parts coupling portion 228. That is, the front receiving groove 324 can be located at the rear of the electric parts coupling portion 228. The front receiving groove 324 can extend in the front and rear direction X in consideration of the coupling direction of the control panel 200, and a front end of the front receiving groove 324 can be opened forward.

In the process in which the control panel 200 is inserted between the first front panel 112 and the second front panel 122, the electric parts coupling portion 228 can be inserted into the front receiving groove 324 through the open front end of the front receiving groove 324. FIG. 9 shows the front receiving groove 324 defined in the upper end extension 320 of the lower frame 300.

In some implementations, as shown in FIG. 14, a length of the top face 220 of the control panel 200 extending rearward from the front face 210 can be less than a length of the bottom face 230 extending rearward from the front face 210, so that the interference with the upper end extension 320 of the lower frame 300 can be prevented.

As described above, the top face 220 of the control panel 200 can be disposed adjacent to the upper end extension 320 of the lower frame 300 in the vertical direction Z. The upper end extension 320 of the lower frame 300 has the top coupling portion 350 coupled to the first front panel 112, and the top face 220 of the control panel 200 can have the electric parts coupling portion 228.

As such, the upper end extension 320 of the lower frame 300 and the top face 220 of the control panel 200 can respectively have components for the coupling and the support in a relationship therebetween, which can cause the structural interference therebetween.

In consideration of the above structural features, in some implementations, the top face 220 of the control panel 200 is formed to have a smaller length than the bottom face 230, so that the structural interference between the upper end extension 320 of the lower frame 300 and the top face 220 of the control panel 200 can be prevented, and structural degrees of freedom therebetween can be effectively improved.

In some implementations, as described above, the top face opening 263 and the top face fastening elastic portion 266 can be respectively defined in and disposed on the top face 220 of the control panel 200, and the bottom face opening 264 and the bottom face fastening elastic portion 267 can be respectively defined in and disposed on the bottom face 230 of the control panel 200.

In some implementations, referring to FIGS. 12 and 13, the top face fastening elastic portion 266 can be disposed to intersect the top face opening 263 along the left and right direction Y of the control panel 200, and the bottom face fastening elastic portion 267 can be disposed to intersect the bottom face opening 264 along the front and rear direction X of the control panel 200.

That is, the top face fastening elastic portion 266 can extend along the left and right direction Y of the control panel 200, and the bottom face fastening elastic portion 267 can extend along the front and rear direction X of the control panel 200. The top face opening 263 can also extend in the left and right direction Y like the top face fastening elastic portion 266, and the bottom face opening 264 can also extend in the front and rear direction X like the bottom face fastening elastic portion 267.

As described above, at least a portion of the upper end extension 320 of the lower frame 300 overlaps the top face 220 of the control panel 200 and has a coupling relationship with the first front panel 112 and the like, so that the top face 220 of the control panel 200 can have a length of extending from the front face 210 that is smaller than that of the bottom face 230 to minimize the structural interference with the upper end extension 320.

Accordingly, the top face fastening elastic portion 266 disposed on the top face 220 has a disadvantage in extending in the front and rear direction X because of the small length of the top face 220. Accordingly, the top face fastening elastic portion 266 can extend in the left and right direction Y of the control panel 200. The top face opening 263 can also extend in the left and right direction Y like the top face fastening elastic portion 266.

In addition, because of the characteristics of the bottom face 230 having the larger extension length compared to the top face 220, the bottom face fastening elastic portion 267 disposed on the bottom face 230 can extend in the front and rear direction X unlike the top face fastening elastic portion 266, and the bottom face opening 264 can also extend in the front and rear direction X like the bottom face fastening elastic portion 267. The panel fastening portion 260 can protrude upward from the top face fastening elastic portion 266 and can protrude downward from the bottom face fastening elastic portion.

In some implementations, referring to FIG. 12 again, the laundry treating apparatus 1 can have a drain passage 270 extending in the left and right direction Y on the top face 220 of the control panel 200.

The drain passage 270 can extend along the left and right direction Y on the top face 220, and water falling to the top face 220 can be drained by flowing in the left and right direction Y along the drain passage 270.

Specifically, as described above, the water can exist inside the first treating apparatus 10 and the second treating apparatus 20, such as a washing machine or a condensing dryer, and the water can leak or can be generated in other operating situations of the first treating apparatus 10.

The water can fall along the first treating apparatus 10 or can be supplied to the control panel 200 in other schemes. As described above, the control panel 200 can have the display and the manipulation unit on the front face thereof, and can have the electric parts 224 therein. Therefore, it is necessary to prevent the water existing on the control panel 200 from flowing into the control panel 200 or flowing along the front face 210.

In some examples, the drain passage 270 can be defined on the top face 220 of the control panel 200, and the inflow of the water supplied to the top face 220 of the control panel 200 to the front face 210 or the interior of the control panel 200 can be minimized through the drain passage 270.

In addition, because the control panel 200 is located below the first front panel 112, in consideration of the situation in which the water flowing downward along the first front panel 112 falls to the top face 220 of the control panel 200, in some implementations, the drain passage 270 can be formed on the top face 220 of the control panel 200.

The drain passage 270 can be formed in various shapes, and can be formed in various schemes as necessary. FIG. 12 shows a state in which the drain passage 270 opened upward is disposed on the top face 220.

The drain passage 270 can extend along the left and right direction Y of the control panel 200. Accordingly, the water falling to the top face 220 can flow in the left and right direction Y on the top face 220, and a phenomenon in which the water passes the rear end of the top face 220 and flows into the control panel 200 or flows along the front face 210 of the control panel 200 can be suppressed.

In some implementations, referring to FIG. 12 along with FIG. 9, the upper end 211 of the front face 210 is located above the top face 220. The top face 220 can have a passage rib 272 protruding upward and extending in the left and right direction Y at a rear end thereof. The drain passage 270 can be formed by the upper end 211 of the front face 210 and the passage rib 272.

Specifically, the top face 220 of the control panel 200 can extend rearward from the upper end of the front face 210, and the upper end 211 of the front face 210 can be positioned higher than the top face 220. That is, the top face 220 can extend rearward from the front face 210 at a vertical level lower than that of the upper end 211 of the front face 210. In other words, the front face 210 can extend upward such that the upper end 211 is positioned higher than the top face 220.

In addition, the passage rib 272 protruding upward and extending along the left and right direction Y can be disposed at the rear end of the top face 220. The top face 220 can extend in the left and right direction Y of the control panel 200 like the front face 210, and the passage rib 272 can also extend in the left and right direction Y along the top face 220.

In addition, as described above, the top face 220 can have the coupling portion receiving groove 269 defined therein that is opened rearward at the rear end thereof. A specific extending shape of the passage rib 272 can correspond to a shape of the rear end of the top face 220. That is, the passage rib 272 can extend along the rear end of the top face 220.

The drain passage 270 can be formed on the top face 220 by the upper end 211 and the passage rib 272 of the front face 210.

That is, the upper end of the front face 210 can form one side wall of the drain passage 270, the passage rib 272 can form an opposite side wall to said one side wall of the drain passage 270, and the top face of the top face 220 can form a bottom face of the drain passage 270 to form the drain passage 270.

In some implementations, the drain passage 270 can be formed on an entirety of the top face of the top face 220. Accordingly, the water falling to or flowing to the top face 220 can be entirely located in the drain passage 270, or can be drained by flowing in the left and right direction Y along the drain passage 270.

In some implementations, an upper end 241 of each side face 240 of the control panel 200 can be located above the top face 220, and both ends of the passage rib 272 in the left and right direction Y can be respectively spaced apart from the side faces 240 respectively facing thereto, so that each drainage 276 can be defined between the upper end 241 of each side face 240 and the passage rib 272.

Specifically, each side face 240 extending rearward from each of both sides in the left and right direction Y of the front face 210 has the upper end 241 positioned higher than the top face 220 like the front face 210. The upper end 211 of the front face 210 and the upper end 241 of the side face 240 can extend integrally. Accordingly, the top face 220 can be disposed such that the front end and both side ends thereof are surrounded by the upper end 211 of the front face 210 and the upper end 241 of the side face 240.

Both side ends of the passage rib 272 in the left and right direction Y can be respectively spaced apart from the upper ends of the side faces 240 respectively facing thereto. That is, in the drain passage 270, an opening can be defined between each side end of the passage rib 272 and the upper end of each side face 240 to define the drainage 276. The water present on the top face 220 can be discharged from the top face 220 through the drainage 276.

In some implementations, both sides in the left and right direction Y of the electric parts 224 that can be arranged inside the control panel 200 can be respectively spaced apart from the inner faces of the side faces 240 by a predetermined distance so as to be prevented from contacting the water discharged through the drainage 276.

As above, by the drain passage 270 defined by the upper end of the front face 210 and the upper ends of the side faces 240, the water falling on the top face 220 can be prevented from leaking to the outside along the front face 210 or the side faces 240, and can be discharged rearward from the both sides in the left and right direction Y of the control panel 200 through the drainages 276 respectively defined between the passage rib 272 and the side faces 240.

In addition, as shown in FIG. 12, the panel support 268 and the panel fastening portion 260 arranged on the top face 220 of the control panel 200 can be located in the drain passage 270. As described above, the panel support 268 can be disposed on the drain passage 270 to support the lower end bending portion 113 of the first front panel 112, and the panel fastening portion 260 can be disposed on the drain passage 270 and penetrate the lower end bending portion 113.

The panel support 268 and the panel fastening portion 260 can respectively include a plurality of panel supports and a plurality of panel fastening portions, can be arranged in left and right direction Y along the drain passage 270, and can be arranged to alternate with each other. Accordingly, a supporting force of the first front panel 112 by the panel support 268 and a fixing force of the first front panel 112 by the panel fastening portion 260 can be properly mixed and dispersed.

In some implementations, the top face 220 can further include an inflow prevention rib 274. The inflow prevention rib 274 can extend to surround the opening 262 defined in the top face 220 and protrude upward to prevent the water from flowing into the opening 262. The opening 262 can be the top face opening 263 on which the top face fastening elastic portion 266 is disposed.

The panel fastening portion 260 can be disposed in the drain passage 270 and can be disposed on the fastening elastic portion 265 disposed with the opening 262. That is, the opening 262 on which the fastening elastic portion 265 is formed can be defined in the drain passage 270, and the water on the top face 220 can fall into the control panel 200 through the opening 262.

Accordingly, in some implementations, the inflow prevention rib 274 surrounding the opening 262 can be formed on the top face 220 to prevent the water leakage through the opening 262.

The inflow prevention rib 274 can extend in a ring shape to surround a circumference of the opening 262. The ring shape can be various depending on the shape of the opening 262, and can have, for example, a polygonal or circular cross-section.

As a result, while being prevented from flowing into the opening 262 by the inflow prevention rib 274, the water on the drain passage 270 defined by the upper end of the front face 210 and the passage rib 272 can flow in the left and right direction Y along the drain passage 270 and be drained.

In some implementations, the coupling portion receiving groove 269 can be defined in the top face 220. The passage rib 272 extending along the rear end of the top face 220 can be extended so as to correspond to the coupling portion receiving groove 269, so that the water leakage into the coupling portion receiving groove 269 can be prevented.

A portion of the passage rib 272 extending along the coupling portion receiving groove 269 can extend to correspond to the shape of the coupling portion receiving groove 269. FIG. 12 shows the passage rib 272 that extends by being bent or curved to correspond to the coupling portion receiving groove 269 having an approximately rectangular cross-section.

Figure 16:
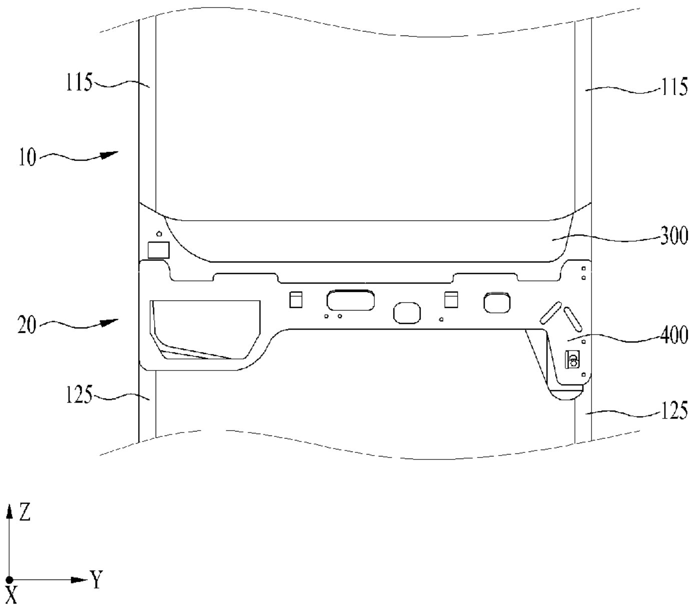
FIG. 16 is a view showing the lower frame and an example of an upper frame.

In some implementations, FIG. 16 shows the laundry treating apparatus 1 in which the first front panel 112 and the second front panel 122 are omitted, and shows the lower frame 300 of the first treating apparatus 10 and an upper frame 400 of the second treating apparatus 20. In addition, FIG. 17 shows an exploded perspective view of the lower frame 300 and the upper frame 400.

Figure 17:
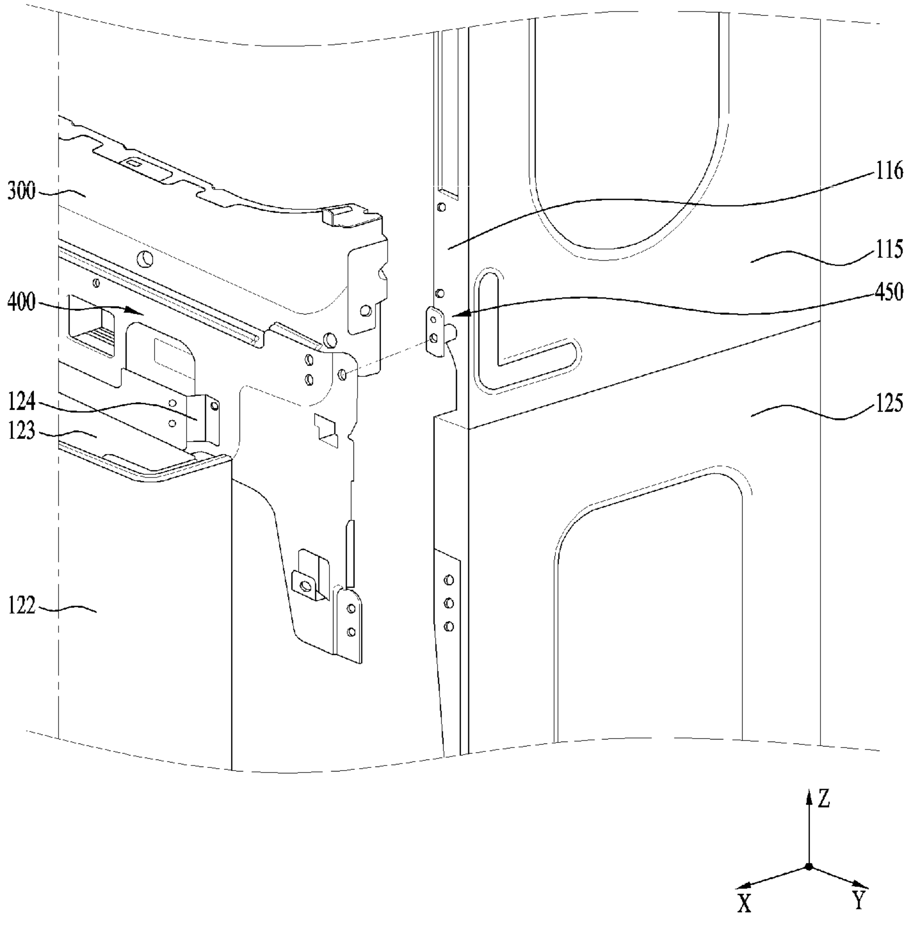
FIG. 17 is a view showing the lower frame and the upper frame that are separated from the laundry treating apparatus.

Referring to FIGS. 16 and 17, the laundry treating apparatus 1 can include the upper frame 400. The upper frame 400 can be disposed on a rear face of the second front panel 122, and can be coupled to the first side panels 115 through insulating connection members 450 made of an insulating material, so that the upper frame 400 can be insulated from the first side panels 115.

Hereinafter, the insulating portion electrically insulating the first treating apparatus 10 and the second treating apparatus 20 from each other and connecting the first treating apparatus 10 and the second treating apparatus 20 with each other in the laundry treating apparatus 1 will be described in detail as follows.

The laundry treating apparatus 1 can include the first treating apparatus 10 and the second treating apparatus 20. The first treating apparatus 10 can include the first cabinet 110 forming an appearance thereof and the first drum 12 disposed inside the first cabinet 110 to accommodate laundry therein.

The second treating apparatus 20 can include the second cabinet 120 forming an appearance thereof and the second drum 22 disposed inside the second cabinet 120 to accommodate laundry therein. The second treating apparatus 20 can be located beneath the first treating apparatus 10 to support the first treating apparatus 10.

The first treating apparatus 10 and the second treating apparatus 20 can be electrically insulated from each other and connected to each other through the insulating portion containing an insulating material. For example, the insulating portion can be constructed to electrically insulate the first front panel 112, the first side panels 115, and the first rear panel 118 of the first cabinet 110 respectively from the second front panel 122, the second side panels 125, and the second rear panel 128 of the second of the second cabinet 120, and connect the first front panel 112, the first side panels 115, and the first rear panel 118 of the first cabinet 110 respectively to the second front panel 122, the second side panels 125, and the second rear panel 128 of the second of the second cabinet 120.

The insulating portion can be constructed as the insulator with respect to the outside by containing the insulating material. An entirety of the insulating portion can be made of the insulating material, or the insulating material can be coated or contained on an outer face of the insulating portion.

The insulating portion can connect the first treating apparatus 10 and the second treating apparatus 20 with each other such that the first treating apparatus 10 and the second treating apparatus 20 can be electrically insulated from each other.

The insulating portion can include a plurality of components. For example, the insulating portion can include front insulating members 450, a rear insulating member 480, and a bottom insulating member to be described later in addition to the control panel 200 described above. The bottom insulating member can include a first bottom insulating member 510 and second bottom insulating member 530.

The first treating apparatus 10 can be electrically insulated from the second treating apparatus 20 by having the insulating portion at a portion that is in contact with or coupled to the second treating apparatus 20. For example, the control panel 200 can be disposed between the first front panel 112 disposed on the front face of the first cabinet 110 and the second front panel 122 disposed on the front face of the second cabinet 120, and connect the first front panel 112 to the second front panel 122 while electrically insulating the first front panel 112 and the second front panel 122 from each other.

Each front insulating member 450 can be coupled to the upper frame 400 disposed at the rear of the second front panel 122 and protruding upward from the second front panel 122 to connect the upper frame 400 to the first cabinet 110 while electrically insulating the upper frame 400 from the first cabinet 110. Each front insulating member 450 can include protrusions and holes.

The rear insulating member 480 can be coupled to the first rear panel 118 disposed on the rear face of the first cabinet 110 and the second rear panel 128 disposed on the rear face of the second cabinet 120 together to connect the first rear panel 118 to the second rear panel 128 while electrically insulating the first rear panel 118 from the second rear panel 128.

The bottom insulating member can be disposed between the first cabinet 110 and the second cabinet 120 to electrically insulate and support the bottom face of the first cabinet 110 from the top face of the second cabinet 120.

In some implementations, the first treating apparatus 10 and the second treating apparatus 20 can respectively include components that are electrically driven like a driving unit, and the components can be operated through electric/electronic signals.

Therefore, a short circuit between the first treating apparatus 10 and the second treating apparatus 20 may be disadvantageous to the operation of each of the first treating apparatus 10 and the second treating apparatus 20. Accordingly, the present disclosure describes the insulating portion that can provide stable fastening between the first treating apparatus 10 and the second treating apparatus 20 while electrically separating the first treating apparatus 10 and the second treating apparatus 20 from each other.

In some implementations, the upper frame 400 can be disposed on the rear face of the second front panel 122 and can protrude upward from the second front panel 122, so that the upper frame 400 can be coupled to the first treating apparatus 10.

The insulating portion can include the front insulating members 450, and the front insulating members 450 can be coupled to the upper frame 400 to electrically insulate the upper frame 400 from the first treating apparatus 10.

Specifically, the upper frame 400 can be located at a top of the front face of the second treating apparatus 20, and can be coupled to the first treating apparatus 10 to fasten the first treating apparatus 10 and the second treating apparatus 20 with each other.

The upper frame 400 can be disposed on the rear face of the second front panel 122, and can be disposed in front of the second top panel and the second side panels 125 of the second treating apparatus 20 as shown in FIG. 17. That is, the upper frame 400 can be disposed between the second front panel 122 and each second side panel 125.

FIG. 16 shows a state in which a detergent opening penetrated by a detergent storage unit for supplying detergent is defined in the second treating apparatus 20. That is, in FIG. 16, the second treating apparatus 20 can correspond to the washing machine that treats the laundry using the detergent, and the detergent opening penetrated by the detergent storage unit can be defined in the upper frame 400.

The upper frame 400 can be coupled with the second side panels 125 respectively on the both sides in the left and right direction Y, and can be coupled with the second front panel 122 at the front. The upper frame 400 can contribute to improving structural stability and stiffness of the top of the second treating apparatus 20.

The upper frame 400 can be fixed to the second treating apparatus 20, and an upper portion thereof extending upward can be coupled to the lower portion of the first treating apparatus 10. The upper frame 400 can have a face parallel to the second front panel 122 and can be disposed on the front face of the second treating apparatus 20.

In some implementations, the first treating apparatus 10 and the second treating apparatus 20 can correspond to apparatuses that are independent of each other, and can respectively have components that use electricity, such as the motor, the controller, or the like, therein.

When a situation in which the electricity leaks from one of the first treating apparatus 10 and the second treating apparatus 20 occurs, it is necessary to prevent the leaked electricity from affecting the other.

That is, the first treating apparatus 10 and the second treating apparatus 20 need to be electrically insulated from each other, so that electric leakage does not occur therebetween.

Accordingly, in some implementations, the insulating connection member 450 can be used for fastening the upper frame 400 of the second treating apparatus 20 with the first treating apparatus 10, and the upper frame 400 can be connected to the first treating apparatus 10 through the insulating connection member 450.

The insulating connection member 450 can be made of the insulating material. The insulating material can be selected as various materials according to need, such as a plastic material, a rubber material, a mixed material of the plastic and the rubber, or the like.

The upper frame 400 can have a coupling relationship with the first front panel 112 or the first side panel 115 of the first treating apparatus 10 or other components of the first treating apparatus 10, and can be fastened to the first treating apparatus 10 through the front insulating members 450. A lower end of the upper frame 400 can be coupled to the second side panel 125, and an upper end of the upper frame 400 can be coupled to each first side panel 115 through each front insulating member 450.

That is, the insulating connection member 450 can insulate the upper frame 400 and the first treating apparatus 10 from each other while coupling the upper frame 400 with the component of the first treating apparatus 10. FIGS. 16 and 17 show a state in which the upper frame 400 is coupled to the first side panels 115 of the first treating apparatus 10 and is insulated from the first side panels 115 through the insulating connection members 450.

The insulating connection member 450 can be formed in various shapes, and can fasten the first treating apparatus 10 with the upper frame 400 in various fastening schemes. For example, the insulating connection member 450 can have the various fastening schemes, such as being formed in a hook shape, including a coupling member inserted therein, or being adhered to one face of the upper frame 400.

In some implementations, referring to FIG. 17, in the upper frame 400, lower portions of both side portions in the left and right direction Y can be respectively coupled to the second side panels 125, and upper portions of the both side portions can be respectively coupled to the first side panels 115 through the insulating connection members 450.

The upper frame 400 can have a face parallel to the front face of the second front panel 122, and can extend in the left and right direction Y, so that at least portions of the both side portions in the left and right direction Y can be arranged in front of the second side panels 125.

The lower portions of the both side portions of the upper frame 400 can be respectively coupled to the second side panels 125, and the upper portions of the both side portions can be respectively coupled to the first side panels 115. That is, the both sides in the left and right direction Y of the upper frame 400 can be coupled together to the first front panel 112 of the first treating apparatus 10 and the second front panel 122 of the second treating apparatus 20.

The coupling scheme of the upper frame 400 can be various. For example, a hook can be formed on the upper frame 400 and coupled to the first front panel 112 and/or the second front panel 122, and the upper frame 400 can be coupled to the first front panel 112 and/or the second front panel 122 through the coupling member such as a screw or the like as shown in FIG. 17.

Figure 18:
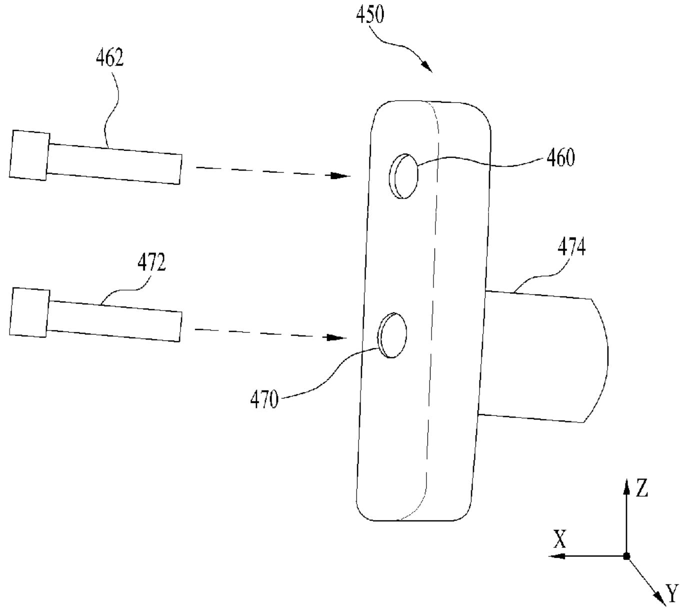
FIG. 18 is a view showing an example of a front insulating member.

In some implementations, FIG. 17 shows each insulating connection member 450 that couples the upper frame 400 and each first side panel 115 with each other, and FIG. 18 shows a perspective view of the insulating connection member 450. In addition, FIG. 19 is a cross-sectional view showing the coupling structure of each first side panel 115, the insulating connection member 450, and the upper frame 400.

Figure 19:
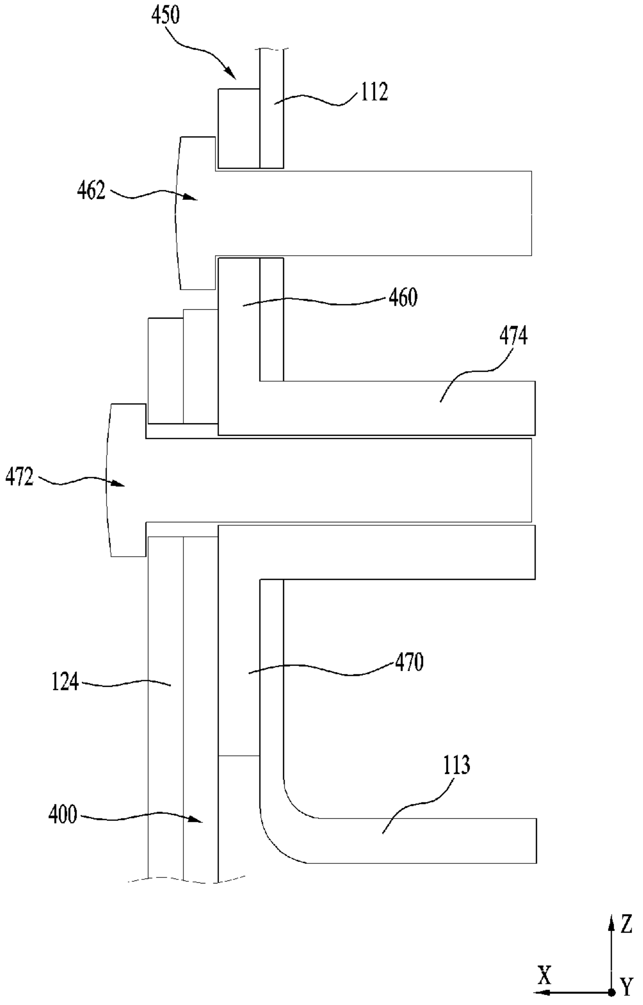
FIG. 19 is a cross-sectional view showing an example of a coupling structure of the front insulating member and the upper frame.

Referring to FIGS. 17 to 19, in some implementations, each insulating connection member 450 can include a first fastening portion 460 and a second fastening portion 470 defined therein. The first fastening portion 460 can be coupled to the first side panel 115, the second fastening portion 470 can be coupled to the upper frame 400, and the second fastening portion 470 can insulate the upper frame 400 and the first side panel 115 from each other.

Specifically, the insulating connection member 450 can have the first fastening portion 460 and the second fastening portion 470 connected to each other. The insulating connection member 450 can be fixed to the first side panel 115 as the first fastening portion 460 is coupled to the first side panel 115.

In addition, for example, the upper portions of the both side portions of the upper frame 400 can be respectively coupled to the second fastening portions 470, and thus, the upper frame 400 can be fixed to the insulating connection members 450. That is, the upper frame 400 is fixed to the insulating connection members 450, and the insulating connection members 450 are respectively fixed to the first side panels 115, thereby the fixing structure of the coupling structure between the upper frame 400 and the first side panel 115 can be formed.

The coupling scheme between the first fastening portion 460 and the first side panel 115 and the coupling scheme between the second fastening portion 470 and the upper frame 400 can be variously determined as needed. For example, a fitting coupling, a hook coupling, or the like can be used, or the coupling relationship can be formed through a fastening member penetrating the insulating connection member 450 as shown in FIGS. 18 and 19.

The upper frame 400 is coupled to the first side panels 115 through the insulating connection members 450 made of the insulating material, so that the insulation between the upper frame 400 and the first side panels 115 can be achieved by the insulating connection members 450.

For example, as shown in FIG. 19, the second fastening portion 470 of the upper frame 400 can be positioned between the upper frame 400 and the first side panel 115 to prevent direct contact between the upper frame 400 and the first side panel 115, thereby insulating the upper frame 400 and the first side panel 115 from each other.

In some implementations, the first fastening portion 460 can extend upward from the second fastening portion 470 coupled with the upper frame 400, and the upper frame 400 coupled to the second fastening portion 470 can be fastened to the first side panel 115 through the first fastening portion 460.

The both side portions of the upper frame 400 extending upward from the second treating apparatus 20 are respectively coupled to the second fastening portions 470, and the first fastening portions 460 are respectively coupled to the first side panels 115 while being respectively coupled to the second fastening portions 470, so that the first fastening portion 460 can be located above the second fastening portion 470.

That is, the first fastening portion 460 located at an upper portion of each insulating connection member 450 can be coupled to each first side panel 115, and the second fastening portion 470 located at a lower portion of each insulating connection member 450 can be coupled to the upper frame 400 while facing each side portion of the upper frame 400.

In other words, the first fastening portion 460 can be defined extending upward from the second fastening portion 470, and the second fastening portion 470 can be defined extending downward from the first fastening portion 460.

In some implementations, the laundry treating apparatus 1 can further include a first fastening member 462 and a second fastening member 472. The first fastening member 462 can penetrate the first fastening portion 460 and the first side panel 115 together to fasten the first fastening portion 460 with the first side panel 115, and the second fastening member 472 can penetrate the upper frame 400 and be inserted into the second fastening portion 470 to fasten the upper frame 400 with the second fastening portion 470. The second fastening portion 470 can insulate the second fastening member 472 and the first side panel 115 from each other.

Specifically, each insulating connection member 450 can be coupled to each first side panel 115 and the upper frame 400 through each first fastening member 462 and each second fastening member 472. The first fastening member 462 can be formed in a shape of a screw, a rivet, or the like, and can penetrate the first fastening portion 460 and the first side panel 115 together. In some examples, each of the first fastening member 462 and the second fastening member 472 can have a bar or cylindrical shape or include a protrusion.

Because the first fastening member 462 is not directly in contact with the upper frame 400, the first fastening portion 460 does not need to insulate the first fastening member 462 and the first side panel 115 from each other.

In some implementations, the upper frame 400 can be penetrated by the second fastening member 472, and the second fastening member 472 penetrated the upper frame 400 can be coupled to the second fastening portion 470 of the insulating connection member 450. In this connection, the second fastening portion 470 can be defined to insulate the second fastening member 472 and the first side panel 115 from each other.

The second fastening member 472 that can penetrate the upper frame 400 and can be in contact with and electrically connected to the upper frame 400 needs to be electrically insulated from the first side panel 115. Accordingly, the insulating connection member 450 can be constructed such that the second fastening portion 470 insulates the second fastening member 472 and the first side panel 115 from each other.

There can be various schemes of insulating, by the second fastening portion 470, the second fastening member 472 and the first side panel 115 from each other. For example, the second fastening portion 470 can be disposed in front of the first side panel 115, and the second fastening member 472 can be inserted into and coupled to only the second fastening portion 470 excluding the first side panel 115 in the state of penetrating the upper frame 400, so that the second fastening member 472 can be insulated from the first side panel 115.

Alternatively, as shown in FIGS. 18 to 19, the second fastening portion 470 can be defined to surround the second fastening member 472 to insulate the first side panel 115 and the second fastening member 472 from each other.

In some implementations, as shown in FIGS. 17 to 19, the second fastening portion 470 can include a fastening insulating portion 474. The fastening insulating portion 474 can extend to penetrate the first side panel 115, at least a portion of the second fastening member 472 can be inserted into the fastening insulating portion 474, and the fastening insulating portion 474 can insulate the second fastening member 472 and the first side panel 115 from each other.

The fastening insulating portion 474 can be formed in a hollow shape, and can extend along an insertion direction of the second fastening member 472 to penetrate the first side panel 115. That is, the second fastening member 472 can be constructed to penetrate the upper frame 400 and the first side panel 115 together, but a portion of the second fastening member 472 penetrating the first side panel 115 can be surrounded by the fastening insulating portion 474.

The second fastening member 472 penetrated the upper frame 400 can penetrate the second fastening portion 470 and can be inserted into and coupled to the fastening insulating portion 474. The second fastening member 472 can penetrate the upper frame 400 or the first side panel 115 in the longitudinal direction like the screw or the rivet.

The second fastening member 472 can be coupled to the second fastening portion 470 while having a length of penetrating the first side panel 115 together with the upper frame 400 by the fastening insulating portion 474, so that the coupling force can be improved. Because the second fastening member 472 is eventually inserted into and coupled to the fastening insulating portion 474 of the second fastening portion 470, the insulation between the first side panel 115 and the second fastening member 472 can be achieved. Accordingly, the upper frame 400 that can be electrically connected to the second fastening member 472 can be insulated from the first side panel 115.

The fastening insulating portion 474 can be formed in a shape in which an extended end thereof is sealed to receive the second fastening member 472 in the fastening insulating portion 474, or in a shape in which the extended end is opened and an end of the second fastening member 472 is exposed to the outside of the fastening insulating portion 474.

The fastening insulating portion 474 can be constructed to surround at least a portion of the second fastening member 472 that is positioned parallel to the first side panel 115 to receive at least a portion of the second fastening member 472 therein, and can insulate the first side panel 115 and the second fastening member 472 from each other. The first fastening member 462 and the second fastening member 472 can be separated apart from each other to be electrically separated from each other.

In some implementations, each first side panel 115 can include the front bending portion 116 at the front end thereof. The fastening insulating portion 474 can penetrate the front bending portion 116.

Specifically, the front end of each first side panel 115 can be located adjacent to the first front panel 112, and the front bending portion 116 of each first side panel 115 can extend in the left and right direction Y from the front end of each first side panel 115.

That is, the front bending portion 116 of each first side panel 115 can be disposed parallel to the front face of the first front panel 112. The first side panel 115 disposed on one side in the left and right direction Y of the first treating apparatus 10 can include the front bending portion 116 extending toward the other side in the left and right direction Y, and the first side panel 115 disposed on the other side in the left and right direction Y of the first treating apparatus 10 can include the front bending portion 116 extending toward said one side in the left and right direction Y.

That is, the front bending portion 116 of the first side panel 115 can extend from a front end of a side face of the first side panel 115 forming the side face of the first treating apparatus 10 to the interior of the first treating apparatus 10. The front bending portion 116 can be formed by being bent or curved at the side face of the first side panel 115.

The front bending portion 116 can have a face parallel to the first front panel 112, and the first fastening member 462 and the second fastening portion 470 can have lengths in the front and rear direction X and can penetrate the front bending portion 116 along the front and rear direction X.

The insulating connection member 450 and the upper frame 400 can be located in front of the front bending portion 116 of the first side panel 115, and the fastening insulating portion 474 can extend rearward from the second fastening portion 470 to penetrate the front bending portion 116.

That is, as shown in FIG. 19, in some implementations, the second fastening member 472 can penetrate the upper frame 400, the second fastening portion 470, and the front bending portion 116 of the second side panel 125 in order. At least the portion of the second fastening member 472 can be inserted into the fastening insulating portion 474 of the second fastening portion 470 and can be coupled to the second fastening portion 470.

The second fastening portion 470 has the fastening insulating portion 474 penetrating the second side panel 125, so that the coupling force between the insulating connection member 450 and the first side panel 115 can be strengthened, and the coupling force between the second fastening member 472 and the second fastening portion 470 can also be strengthened, thereby improving the structural stability.

In some implementations, as shown in FIG. 17, the second front panel 122 can further include an upper fastening portion 124. The upper fastening portion 124 can be penetrated together with the upper frame 400 by the second fastening member 472 to be fastened to the second fastening portion 470.

That is, the upper fastening portion 124 can be positioned in front of the upper frame 400 and fastened to each first side panel 115 together with the upper frame 400 through each front insulating member 450. FIG. 19 shows a coupling structure from which the upper fastening portion 124 is omitted.

Referring to FIG. 17, the upper fastening portion 124 can be disposed above the second front panel 122, and the upper fastening portion 124 can be disposed on the upper end bending portion 123 of the second front panel 122. That is, the upper fastening portion 124 can have a shape extending upward from a rear end of the upper end bending portion 123 extending rearward from the upper end of the second front panel 122.

The upper fastening portion 124 can be overlapped with the upper frame 400 and the insulating connection member 450 in the front and rear direction X, and the second fastening member 472 can penetrate the upper fastening portion 124 of the second front panel 122, the upper frame 400, the insulating connection member 450, and the first side panel 115 in order and be coupled to the second fastening portion 470 of the insulating connection member 450. In some implementations, the upper fastening portion 124 can be electrically connected to the second fastening member 472 and the upper frame 400.

Because the second front panel 122 forms a coupling relationship with each first side panel 115 by the upper fastening portion 124, the fixing force of the second front panel 122 is improved, and at the same time, the fastening structure between the first treating apparatus 10 and the second treating apparatus 20 is also reinforced, which are advantageous.

In some implementations, in the laundry treating apparatus 1, the control panel 200 can be included in the insulating portion. That is, the control panel 200 can correspond to one component of the insulating portion. The control panel 200 can be inserted between the first front panel 112 and the second front panel 122 to connect the first front panel 112 to the second front panel 122 while electrically insulating the first front panel 112 and the second front panel 122 from each other.

In some implementations, as shown in FIG. 17, the lower frame 300 of the first treating apparatus 10 is coupled to each first side panel 115 together with the upper frame 400. Portions of the lower frame 300 and the upper frame 400 connected to each first side panel 115 can be spaced apart from each other, so that the lower frame 300 and the upper frame 400 can be electrically separated from each other.

For example, a position of the portion of the upper frame 400 coupled to the first side panel 115, that is, the insulating connection member 450 is located below a position of the portion of the lower frame 300 coupled to the first side panel 115, so that the upper frame 400 can be spaced apart from the lower frame 300.

Accordingly, at the same time when the coupling between the lower frame 300 and the first side panel 115 is achieved, the coupling between the upper frame 400 and the first side panel 115 is achieved. In addition, the upper frame 400 is coupled to the first side panel 115 through the insulating connection member 450 and is spaced apart from and electrically separated from the lower frame 300. Thus, not only the structural stability of each of the first treating apparatus 10 and the second treating apparatus 20, but also the fastening force between the first treating apparatus 10 and the second treating apparatus 20 is effectively improved, so that the electrical insulation therebetween can be effectively achieved.

Figure 20:
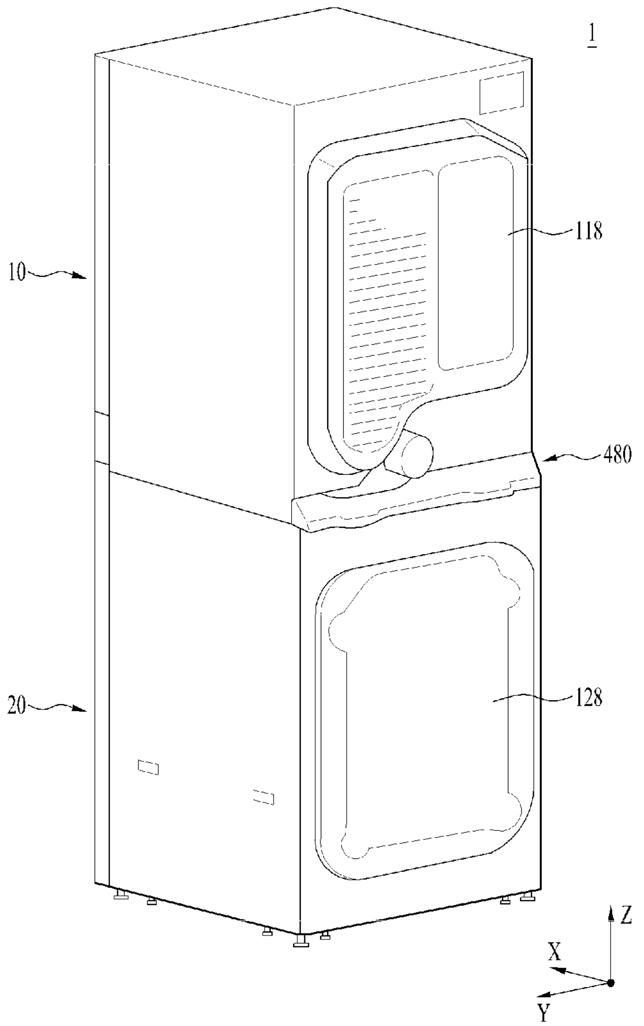
FIG. 20 is a perspective rear view showing the laundry treating apparatus.
Figure 21:
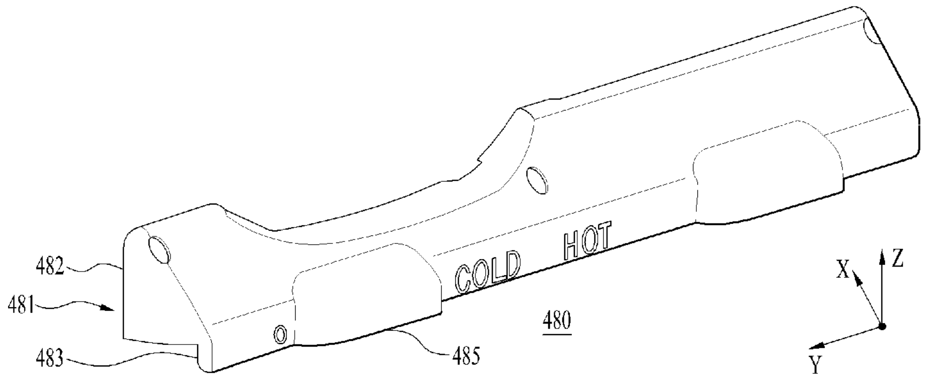
FIG. 21 is a view showing an example of a rear insulating member.

In some implementations, FIG. 20 shows a view of the laundry treating apparatus 1 viewed from the rear, and FIG. 21 shows a rear bracket or rear insulating member 480 connecting the first treating apparatus 10 and the second treating apparatus 20 with each other at the rear.

As shown in FIGS. 20 and 21, in some implementations, the first treating apparatus 10 can have the first rear panel 118 disposed on the rear face thereof, and the second treating apparatus 20 can have the second rear panel 128 disposed on the rear face thereof. In addition, the rear bracket 480 made of an insulating material and fastening the first rear panel 118 and the second rear panel 128 with each other can be further included.

In some implementations, the insulating portion can include the rear insulating member 480. The rear insulating member 480 can be coupled to the first rear panel 118 and the second rear panel 128 to connect the first rear panel 118 and the second rear panel 128 while electrically insulating the first rear panel 118 and the second rear panel 128 from each other.

As described above, the first treating apparatus 10 and the second treating apparatus 20 can be electrically insulated from each other and coupled to each other by the insulating connection member 450 and the upper frame 400 at the front side. Further, the first treating apparatus 10 and the second treating apparatus 20 can be electrically insulated from each other and be coupled to each other through the rear bracket 480 at the rear side.

The first treating apparatus 10 and the second treating apparatus 20 are manufactured separately from each other, and then stacked together and installed to be used together. Therefore, in order to secure the structural stability of the laundry treating apparatus 1, structural fastening between the first treating apparatus 10 and the second treating apparatus 20 stacked together can be required.

Further, as described above, the first treating apparatus 10 and the second treating apparatus 20 respectively include electricity consuming devices independent of each other, such as the components like the motors, the controllers, or the like, so that it can be advantageous that the first treating apparatus 10 and the second treating apparatus 20 are electrically insulated from each other.

Accordingly, in some implementations, the first treating apparatus 10 and the second treating apparatus 20 can be fastened to each other through the upper frame 400 and the insulating connection member 450 at the front side of the first treating apparatus 10 and the second treating apparatus 20 stacked together, and can be fastened to each other through the rear bracket 480 at the rear side.

The rear bracket 480 can be made of the insulating material. For example, the rear bracket 480 can be made of the insulating material, such as a plastic material, a rubber material, or a synthetic material of the plastic and the rubber.

The rear bracket 480 can have a length parallel to the left and right direction Y, and can have a length corresponding to a width in the left and right direction Y of the first treating apparatus 10 or the second treating apparatus 20. The rear bracket 480 can be coupled with the first rear panel 118 of the first treating apparatus 10 and the second rear panel 128 of the second treating apparatus 20 together to fasten the first rear panel 118 and the second rear panel 128 with each other.

There can be various coupling schemes between the rear bracket 480, the first rear panel 118, and the second rear panel 128. For example, the rear bracket 480 can be coupled to the first rear panel 118 and the second rear panel 128 together through screws, rivets, or the like, or the hook coupling or the fitting coupling scheme can be used.

Figure 22:
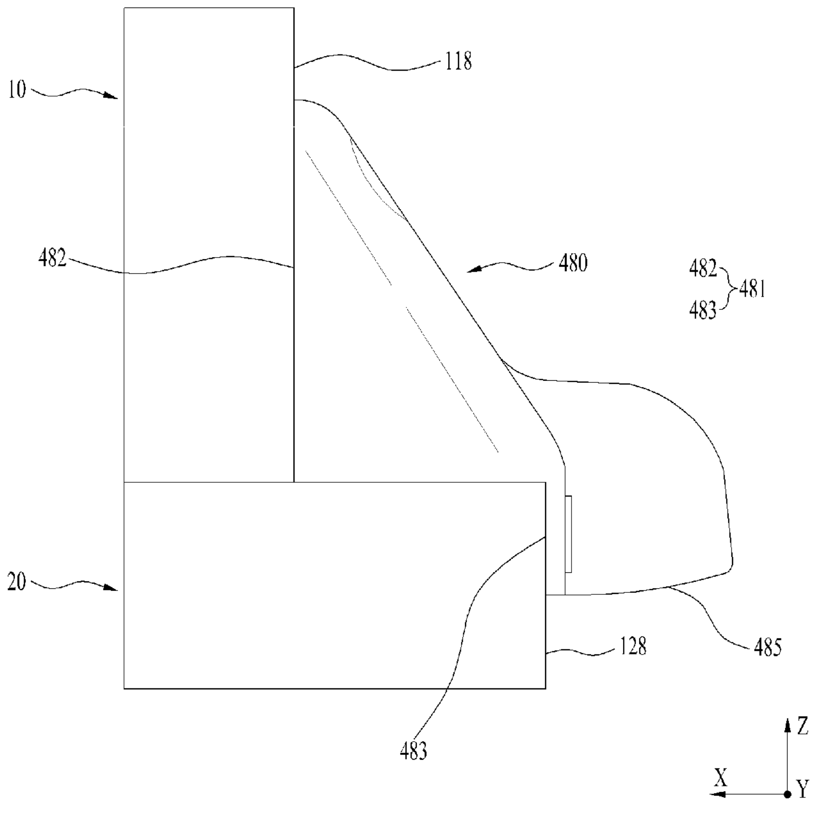
FIG. 22 is a side view showing the rear insulating member.

In some implementations, FIG. 22 is a cross-sectional view of the rear bracket 480 coupled to the first rear panel 118 and the second rear panel 128 viewed from the side.

Referring to FIG. 22, the rear bracket 480 can fasten the first rear panel 118 and the second rear panel 128 with each other as an upper portion of the rear bracket 480 is coupled to the first rear panel 118 and a lower portion of the rear bracket 480 is coupled to the second rear panel 128.

In this connection, a front face 481 facing forward of the rear bracket 480 can have an upper end 482 in contact with the first rear panel 118, and a lower end 483 in contact with the second rear panel 128. That is, in the rear bracket 480, the upper end 482 of the front face 481 can support the first rear panel 118 from the rear, and the lower end 483 of the front face 481 can support the second rear panel 128 from the rear.

In some implementations, as shown in FIG. 22, the first rear panel 118 can be located forward of the second rear panel 128, and the front face 481 of the rear bracket 480 can be formed in a stepped manner such that the upper end 482 supporting the first rear panel 118 is located forward of the lower end 483 supporting the second rear panel 128.

In some implementations, the first rear panel 118 and the second rear panel 128 can be arranged to be spaced apart from each other in the front and rear direction X. For example, the first rear panel 118 can be located forward or rearward of the second rear panel 128. A positional relationship of the first rear panel 118 to the second rear panel 128 can be determined from a design difference between the first treating apparatus 10 and the second treating apparatus 20.

For example, when a length in the front and rear direction X of the first treating apparatus 10 is larger than that of the second treating apparatus 20, the first rear panel 118 can be located rearward of the second rear panel 128. When the length in the front and rear direction X of the first treating apparatus 10 is smaller than that of the second treating apparatus 20, the first rear panel 118 can be located forward of the second rear panel 128.

Alternatively, for an assembly advantage for stacking the first treating apparatus 10 on the second treating apparatus 20, the first rear panel 118 can be positioned in front of the second rear panel 128. For example, in the process of assembling the laundry treating apparatus 1, when the second treating apparatus 20 is placed in an installation region and then the first treating apparatus 10 is lifted on the second treating apparatus 20, the first treating apparatus 10 can slide rearward from a position in front of the second treating apparatus 20 and can be disposed on the second treating apparatus 20.

In this process, the rear bracket 480 can be installed in advance on the second rear panel 128 of the second treating apparatus 20, and the first treating apparatus 10 can be disposed at an appropriate assembly position while a distance of sliding rearward is limited by the rear bracket 480.

In some implementations, the length in the front and rear direction X of the first treating apparatus 10 can be smaller than that of the second treating apparatus 20, or at least the lower portion of the first rear panel 118 can be located forward of the second rear panel 128 such that a stopper role of the rear bracket 480 can be achieved.

The front face 481 of the rear bracket 480 can have the stepped shape as shown in FIG. 22 such that the upper end 482 of the front face 481 that forwardly supports the lower portion of the first rear panel 118 is located forward of the lower end 483 that forwardly supports the upper portion of the second rear panel 128.

When the lower portion of the first rear panel 118 is located rearward of the second rear panel 128, the front face 481 of the rear bracket 480 can have the stepped shape such that the upper end 482 is positioned rearward of the lower end 483.

As the front face 481 of the rear bracket 480 has the stepped shape as above, the rear bracket 480 can be coupled to the first rear panel 118 and the second rear panel 128 and fasten the first rear panel 118 and the second rear panel 128 with each other while allowing a positional difference between the first rear panel 118 and the second rear panel 128, and a support structure for supporting the first rear panel 118 of the first treating apparatus 10 located on the second treating apparatus 20 from the rear can be stably realized.

In some implementations, referring to FIGS. 21 and 22, the laundry treating apparatus 1 can have a handle portion 485 on the rear bracket 480. Specifically, the handle portion 485 opened downward can be disposed on the lower portion of the rear bracket 480.

The handle portion 485 can have a shape of a groove that is open downward and recessed upward. The groove of the handle portion 485 can be defined such that the user can easily grip the handle portion 485 by putting a finger into the groove.

There can be various positions and shapes of the handle portion 485, and FIGS. 21 and 22 show the handle portion 485 that forms a portion of the lower portion of the rear bracket 480 and is opened downward to be gripped by the user.

Figure 23:
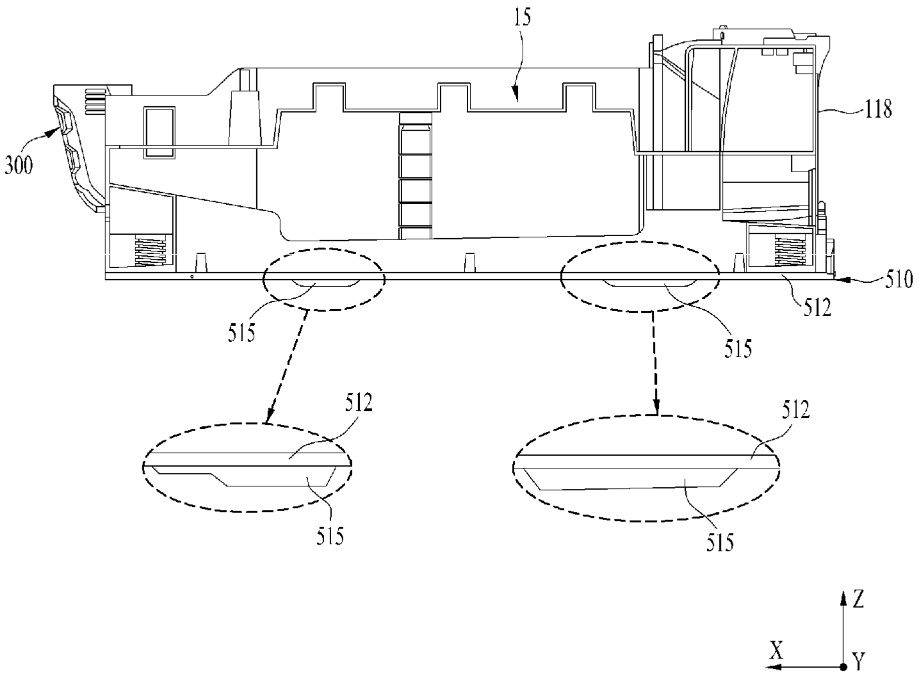
FIG. 23 is a side view showing an example of a first bottom insulating member.

In some implementations, FIG. 23 shows the bottom insulating member. The bottom insulating member can be one component of the insulating portion. That is, in some implementations, the insulating portion can include the bottom insulating member disposed beneath the first cabinet 110 and supported upward by the second cabinet 120, and the second cabinet 120 can support the first cabinet 110 through the bottom insulating member.

The bottom insulating member can be disposed beneath the first cabinet 110. The bottom insulating member can form the bottom face of the first cabinet 110 or can be coupled to the bottom face of the first cabinet 110. The bottom insulating member can be positioned between the first cabinet 110 and the second cabinet 120 in the vertical direction Z. The second cabinet 120 can support the first cabinet 110 through the bottom insulating member.

Figure 28:
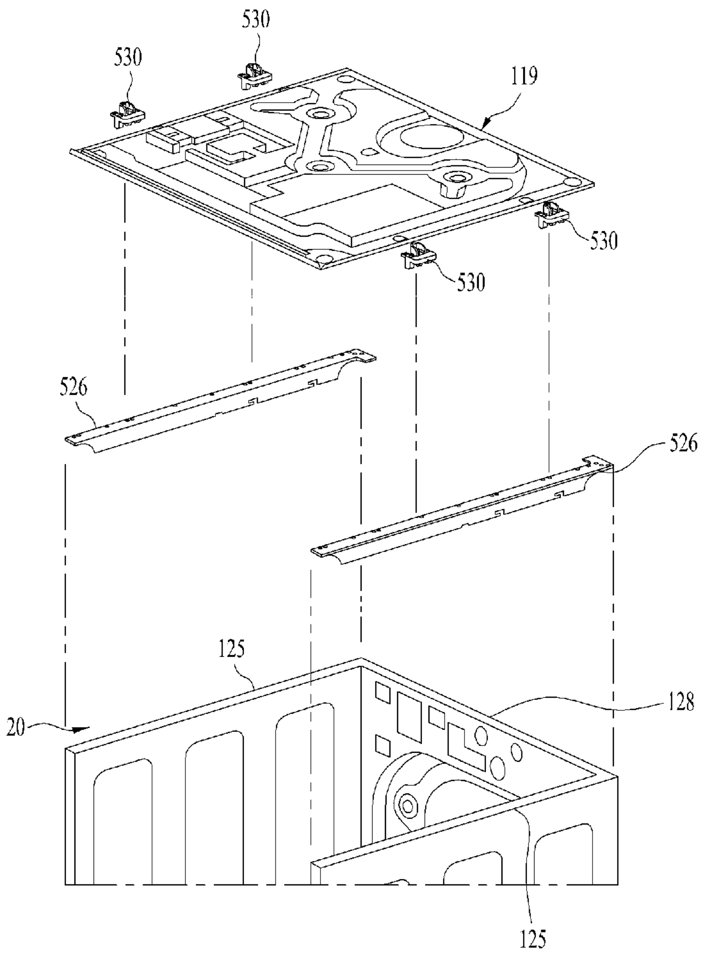
FIG. 28 is a view showing an example of a second bottom insulating member.

In some implementations, the bottom insulating member can include the first bottom insulating member 510 and the second bottom insulating members 530. FIG. 23 shows the first bottom insulating member 510, and FIG. 28 shows the second bottom insulating members 530.

In some implementations, the first side panel 115 and the second side panel 125 can be spaced apart from each other by the bottom insulating member and be insulated from each other. That is, the bottom insulating member can be positioned between the first side panel 115 and the second side panel 125 to electrically insulate the first side panel 115 and the second side panel 125 from each other.

Figure 24:
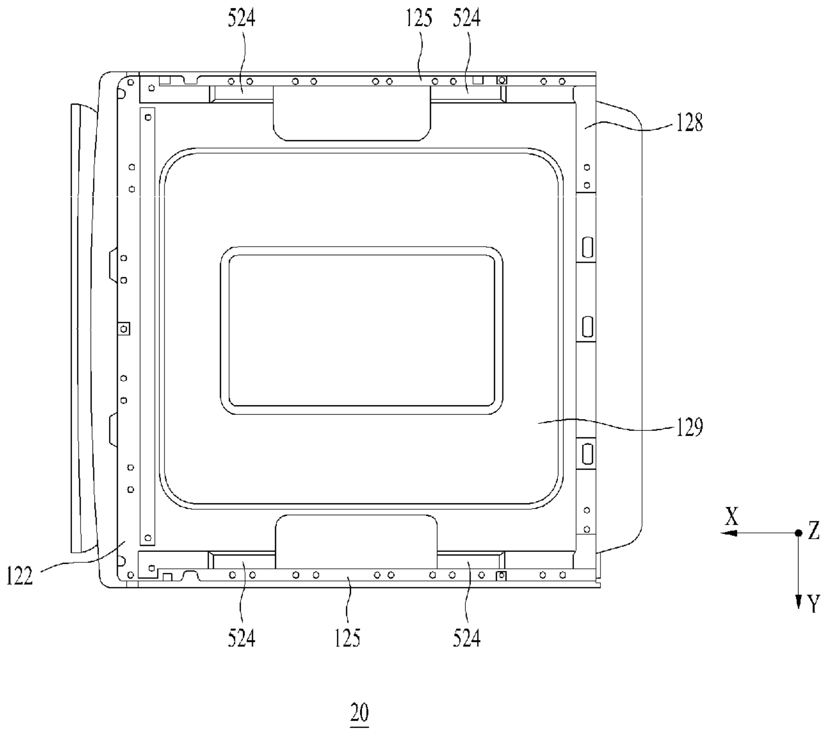
FIG. 24 is a top view showing an example of a second top panel including a leg seating groove defined therein in the laundry treating apparatus.
Figure 27:
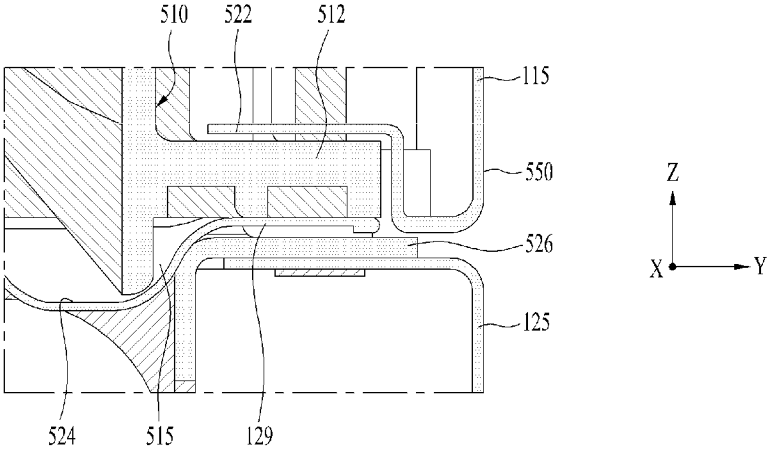
FIG. 27 is a front view showing a cross-section of an example of a first bottom insulating member.

In some implementations, FIG. 23 shows the first bottom insulating member 510 of the bottom insulating member, FIG. 24 shows the second top panel 129 in contact with the first bottom insulating member 510, and FIG. 27 shows cross-sections of each first side panel 115 and each second side panel 125 electrically insulated from each other by the first bottom insulating member 510.

In some implementations, the first cabinet 110 can have an open bottom face, and the first bottom insulating member 510 can be coupled to the first cabinet 110 to shield the open bottom face of the first cabinet 110.

That is, in some implementations, the first bottom insulating member 510 can correspond to the first bottom panel of the first cabinet 110. FIG. 23 shows a state in which the first bottom panel of the first cabinet 110 is constructed as the first bottom insulating member 510.

Referring to FIG. 23, the base cabinet 15 can be included in the first cabinet 110. The base cabinet 15 can be located on the first bottom insulating member 510 corresponding to the first bottom panel of the first cabinet 110. The base cabinet 15 can be integrally formed with the first bottom insulating member 510, or manufactured separately from the first bottom insulating member 510 and can be positioned on the first bottom insulating member 510.

In some implementations, the first treating apparatus 10 can correspond to the dryer for drying the laundry. In this case, the second treating apparatus 20 can be the washing machine for washing the laundry.

When the first treating apparatus 10 has a function of drying the laundry like the dryer, the first treating apparatus 10 can have an air conditioning system or a heating device to supply hot air for drying the laundry.

When the first treating apparatus 10 includes the air conditioning system including a compressor and the like, the base cabinet 15 can include a compressor mounting portion in which a compressor of a heat exchanger is mounted, a fan mounting portion in which a fan of the heat exchanger is mounted, a supply duct connection portion to which a supply duct is connected, an intake duct connection portion to which an intake duct is connected, a water collecting portion connected to a connection duct, wherein a heat absorbing portion and a heating portion of the heat exchanger are located in the water collecting portion, and at the same time, condensate water generated from the heat absorbing portion is stored in the water collecting portion, and a drain pump mounting portion in which a drain pump for draining the water collected in the water collecting portion is installed.

The compressor mounting portion, the motor mounting portion, the fan mounting portion, the water collecting portion, the drainage pump mounting portion, and the like formed in the base cabinet can be variously arranged based on connection of the components and passage configuration.

In some implementations, the water collecting portion can be formed in a shape of a case in which front and rear ends are opened to define the passage by being coupled to the connection duct. In addition, the heat absorbing portion and the heating portion can be located inside a portion at which the water collecting portion and the connection duct are coupled to each other.

In this connection, the intake duct connection portion to which the intake duct is connected can be located at a front end of the water collecting portion, and the supply duct connection portion can be located at a rear end of the water collecting portion. In addition, a conversion passage for converting a direction of air passed through the heat absorbing portion and the heating portion of the water collecting portion toward the supply duct can be further defined between the water collecting portion and the supply duct.

In some implementations, referring to FIG. 23, the first bottom insulating member 510 can include an insulating panel 512 disposed to cover the bottom face of the first cabinet 110 and insulating legs 515 protruding downward from the insulating panel 512.

FIG. 24 illustrates the second top panel 129 of the second cabinet 120 connected to the first bottom insulating member 510. The second top panel 129 can be connected to the first bottom insulating member 510 by supporting the first bottom insulating member 510 upward.

The insulating legs 515 can protrude toward the second top panel 129 and can be supported by the second top panel 129. That is, the insulating legs 515 of the first bottom insulating member 510 can be in contact with and be supported by the second top panel 129.

The insulating legs 515 can include a plurality of insulating legs, and a shape of a cross-section or a protruding length of the insulating leg 515 can be variously determined. In some implementations, each leg seating groove 524 in which each insulating leg 515 is seated can be defined in the second top panel 129.

FIG. 24 is a view of the second top panel 129 in which the leg seating grooves 524 are defined viewed from the above. The leg seating groove 524 can have a shape recessed downward from the second top panel 129. The number of leg seating grooves 524 or a shape of a cross-section of the leg seating grooves 524 can respectively correspond to the number and the shape of the cross-section of the insulating legs 515.

Figure 25:
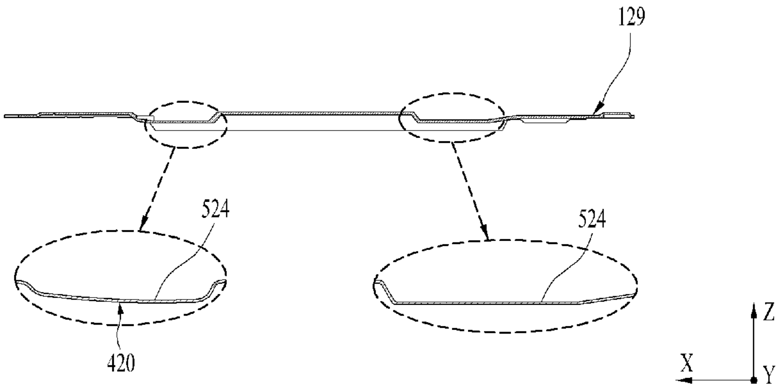
FIG. 25 is a side view showing a cross-section of the leg seating groove in FIG. 24.

FIG. 25 is a view of cross-sections of the leg seating grooves 524 viewed from the second top panel 129 in the left and right direction Y. The second top panel 129 can include the plurality of leg seating grooves 524. At least two leg seating grooves 524 can be arranged side by side in the vertical direction Z as shown in FIG. 25.

The insulating legs 515 and the leg seating grooves 524 can allow the first treating apparatus 10 to be electrically insulated from and be in contact with and supported by the second top panel 129 of the second treating apparatus 20, and at the same time, guide or fix a position of the first treating apparatus 10 on the second treating apparatus 20.

Figure 26A:
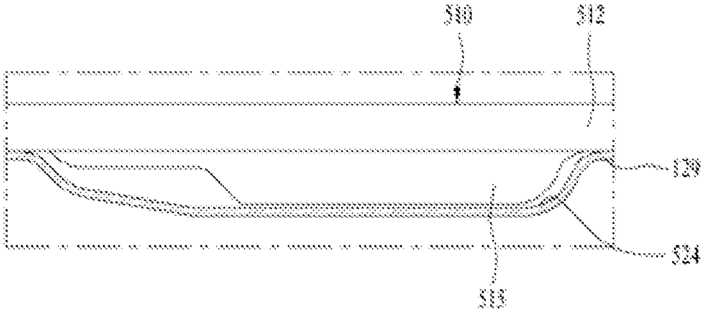
FIGS. 26A and 26B are views showing an example of an insulating leg of a first bottom insulating member that is seated in the leg seating groove.
Figure 26B:
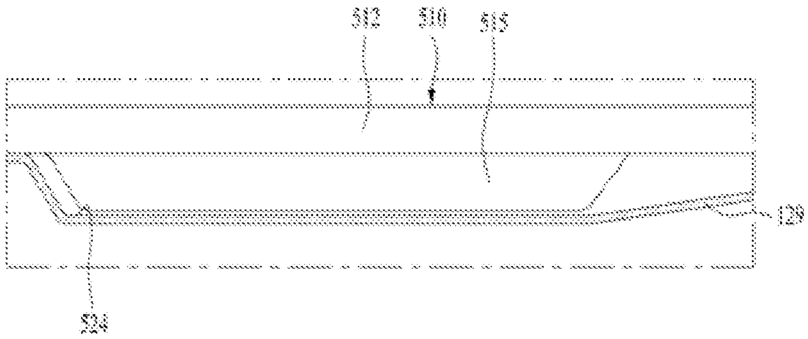

FIGS. 26A and 26B illustrate a state in which each insulating leg 515 is seated in each leg seating groove 524 shown in FIG. 25. Referring to FIGS. 25 to 26B, at least one pair of insulating legs 515 can be arranged side by side in the vertical direction Z. The leg seating grooves 524 in which the pair of insulating legs 515 are respectively seated can be arranged side by side in the vertical direction Z.

In the pair of insulating legs 515, at least a rear end of a front insulating leg 515 can be in close contact with or adjacent to one of a pair of leg seating grooves 524, and at least a front end of a rear insulating leg 515 can be in close contact with or adjacent to the other of the pair of leg seating grooves 524.

That is, the front insulating leg 515 can be constructed such that a movement in a rearward direction is restricted by an inner face of a rear portion of said one of the pair of leg seating grooves 524, and the rear insulating leg 515 can be constructed such that a movement in a forward direction is restricted by an inner face of a front portion of the other of the pair of leg seating grooves 524. Accordingly, the position of the first treating apparatus 10 can be guided or fixed in the front and rear direction X in a relationship between each insulating leg 515 and each leg seating groove 524.

Referring to FIGS. 24 to 26B, the second top panel 129 of the second treating apparatus 20 can have leg seating grooves 524 defined therein on both sides of a front portion thereof in the left and right direction Y, and have leg seating grooves 524 defined therein on both sides of a rear portion thereof in the left and right direction Y.

Each leg seating groove 524 defined in the front portion of the second top panel 129 can have a first guide face, that is, a bottom face, which is recessed such that each insulating leg 515 of the first bottom insulating member 510 is inserted and seated therein. A first front inclined face inclined downward toward the first guide face can be formed in front of the first guide face, and a first rear inclined face inclined downward toward the first guide face can be formed rearward of the first guide face.

The first front inclined face and the first rear inclined face guide the insulating leg 515 to be slid and positioned on the first guide face of the leg seating groove 524.

Each leg seating groove 524 defined in the rear portion of the second top panel 129 can have a second guide face recessed such that each insulating leg 515 of the first bottom insulating member 510 is inserted and seated therein. The second guide face can correspond to a bottom face of the leg seating groove 524 in the rear portion.

A second front inclined face inclined downward can be formed in front of the second guide face, and a second rear inclined face inclined downward toward the second guide face can be formed rearward of the second guide face.

In some implementations, FIG. 27 shows a cross-section showing a state in which the first bottom insulating member 510 is supported on the second top panel 129 of the second cabinet 120.

Referring to FIG. 27, each first side panel 115 of the first cabinet 110 can further include a bottom coupling portion 522. The bottom coupling portion 522 can be coupled to the first bottom insulating member 510. When the first bottom panel of the first cabinet 110 is formed as the first bottom insulating member 510, the first bottom insulating member 510 can be coupled to the bottom coupling portion 522 of each first side panel 115.

In some implementations, the first bottom panel of the first cabinet 110 may not necessarily belong to the insulating portion. For example, when the first bottom panel 119 is formed in a shape of a plate made of a metal material, the first bottom panel 119 can be coupled to the bottom coupling portion 522. That is, the first bottom panel 119 containing the metal material or the first bottom insulating member 510 containing an insulating material can be coupled to the bottom coupling portion 522.

The bottom coupling portion 522 can extend in the front and rear direction X or can include a plurality of bottom coupling portions spaced apart from each other in the front and rear direction X, and at least a portion of ends on both sides of the first bottom insulating member 510 can be coupled to the bottom coupling portion 522.

There can be various schemes of coupling the bottom coupling portion 522 with the first bottom insulating member 510. The first bottom insulating member 510 can have a contact and support relationship with each bottom coupling portion 522, can be adhesively coupled to each bottom coupling portion 522, or can be coupled to each bottom coupling portion 522 using a separate member such as a screw and the like.

In some implementations, referring to FIG. 27, each first side panel 115 can further include a bottom extension portion 550. The bottom extension portion 550 can be positioned at a vertical level lower than that of the bottom coupling portion 522 and shield the bottom coupling portion 522 and at least a portion of the first bottom insulating member 510 in the left and right direction Y.

The bottom extension portion 550 can form a lower end of each first side panel 115 and can form a portion of each side face of the first cabinet 110.

At least a portion of the bottom extension portion 550 can be positioned at a vertical level lower than that of the bottom coupling portion 522. The bottom coupling portion 522 can be positioned higher than a lower end of the bottom extension portion 550. The bottom coupling portion 522 can be positioned interior of the first side panel 115 to face the first bottom insulating member 510, and the bottom extension portion 550 can be constructed such that an outer face thereof is exposed to the outside.

As the bottom extension portion 550 is constructed such that the lower end thereof is positioned at a vertical level lower than that of the bottom coupling portion 522, at least portions of the bottom coupling portion 522 and the second bottom insulating members 530 can be covered when viewed in the left and right direction Y.

That is, the bottom extension portion 550 can be constructed to shield the bottom coupling portion 522 and the first bottom insulating member 510 in the left and right direction Y. At least portions of the bottom coupling portion 522 and the first bottom insulating member 510 can be covered from the outside by the bottom extension portion 550, so that satisfaction of the user in design of the laundry treating apparatus 1 can be improved, and a sense of unity between the first side panel 115 and the second side panel 125 can be improved.

In some implementations, the bottom extension portion 550 can be spaced upwardly apart from the second side panel 125 to be electrically separated from the second side panel 125. FIG. 27 shows a state in which the lower end of the bottom extension portion 550 is spaced apart from the second side panel 125.

In some implementations, the insulation between the first treating apparatus 10 and the second treating apparatus 20 can be made through the first bottom insulating member 510 forming the bottom face of the first cabinet 110. The first bottom insulating member 510 and the like can be shielded through the bottom extension portion 550 extending from the first side panel 115 to cover the first bottom insulating member 510, so that the satisfaction in design can be improved. Further, the bottom extension portion 550 can be constructed to be spaced apart from each second side panel 125, so that the electrical insulation between the first side panel 115 and the second side panel 125 can be achieved.

In some implementations, FIG. 28 shows the second bottom insulating members 530 arranged between the first cabinet 110 and the second cabinet 120 in the laundry treating apparatus 1. The bottom insulating member can include the second bottom insulating members 530, and the second bottom insulating members 530 can be formed together with the first bottom insulating member 510 or can be selectively formed.

For example, the first cabinet 110 can have the first bottom insulating member 510 as the first bottom panel, and the second bottom insulating members 530 can be coupled to the first bottom insulating member 510. Alternatively, the first bottom panel 119 made of the metal material other than the first bottom insulating member 510 can be disposed on the bottom face of the first cabinet 110, and the second bottom insulating members 530 can be arranged on the first bottom panel 119.

Hereinafter, for convenience of description, a description will be achieved based on a state in which the first bottom panel 119 is disposed on the bottom face of the first cabinet 110 and the second bottom insulating members 530 are arranged on the first bottom panel 119 as shown in FIG. 28.

In some implementations, the first cabinet 110 has the first bottom panel 119 on the bottom face thereof, and the second bottom insulating members 530 are coupled to the first bottom panel 119 and supported by the second cabinet 120, and can electrically insulate the first bottom panel 119 from the second cabinet 120.

The second bottom insulating members 530 can be coupled to the first bottom panel 119 and can have a shape protruding downward from the first bottom panel 119. The second bottom insulating members 530 can be arranged to separate the first bottom panel 119 and the second cabinet 120 from each other.

Referring to FIG. 28, the plurality of second bottom insulating members 530 can be arranged and coupled to the first bottom panel 119 of the first cabinet 110. The second bottom insulating members 530 can be formed integrally with the first bottom panel 119.

The second cabinet 120 can have an open top face. The second cabinet 120 can be disposed to support the first cabinet 110 upward through the second side panels 125. The second side panels 125 can be arranged to respectively support the first side panels 115 through the second bottom insulating members 530.

At least a portion of the second bottom insulating member 530 can be positioned above the second side panel 125 of the second cabinet 120. At least a portion of the second bottom insulating member 530 can be inserted into the open top face of the second cabinet 120.

At least a portion of the second bottom insulating member 530 can support the second side panel 125 of the second cabinet 120 in the left and right direction Y. That is, at least a portion of the second bottom insulating member 530 can be constructed to be in contact with an inner face of the second side panel 125.

Reinforcing coupling portions 526 can be respectively arranged upper ends of the respective second side panels 125. The reinforcing coupling portions 526 can extend along the front and rear direction X to respectively cover the upper ends of the respective second side panels 125. The second bottom insulating members 530 can be arranged on the reinforcing coupling portions 526.

The reinforcing coupling portions 526 can be arranged to respectively secure rigidity of the second side panels 125 supporting the first cabinet 110, or can be arranged to induce seating of the second bottom insulating members 530. Further, the reinforcing coupling portions 526 can be arranged to guide the position of the first cabinet 110 on the second cabinet 120.

Figure 29:
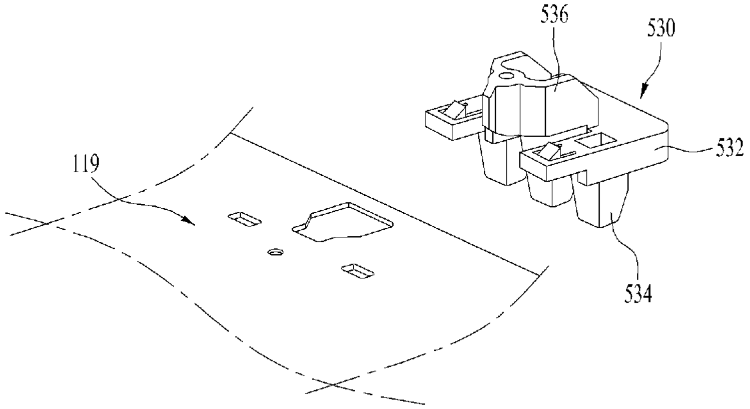
FIG. 29 is a view showing the second bottom insulating member separated from the first bottom panel.

FIG. 29 shows a state in which the second bottom insulating member 530 is separated from the first bottom panel 119. Each second bottom insulating member 530 can include an insulating support 532, an insulating protrusion 534, and an insulating coupling portion 536.

At least a portion of the insulating support 532 can be positioned between the first side panel 115 and the second side panel 125. The insulating support 532 can be constructed to electrically insulate the first side panel 115 and the second side panel 125 from each other.

The insulating protrusion 534 can have a shape protruding downward from the insulating support 532. The insulating protrusion 534 can be located on the open top face of the second cabinet 120. The insulating protrusion 534 can be constructed to be inserted into the open top face of the second cabinet 120.

The insulating protrusions 534 can be arranged to be respectively in contact with the second side panels 125 in the left and right direction Y. The insulating protrusions 534 can be arranged to respectively support the second side panels 125 in the left and right direction Y. The insulating protrusions 534 can be respectively disposed on both sides of the first bottom panel 119 in the left and right direction Y, and the insulating protrusions 534 can be respectively in contact with inner faces of the respective second side panels 125 respectively facing thereto.

The position of the first cabinet 110 on the second cabinet 120 can be fixed based on the left and right direction Y by the insulating protrusions 534. For example, the insulating protrusions 534 can be respectively disposed on the both sides of the first bottom panel 119 in the left and right direction Y and respectively be in contact with the inner faces of the respective first side panels 115 respectively facing thereto, so that the first cabinet 110 can be prevented from moving in the left and right direction Y on the second cabinet 120.

At least a portion of the insulating coupling portion 536 can be inserted into and coupled to the first bottom panel 119. An opening for inserting the insulating coupling portion 536 therein can be defined in the first bottom panel 119, and the insulating coupling portion 536 can be inserted into and coupled to the first bottom panel 119 through the opening.

Figure 30:
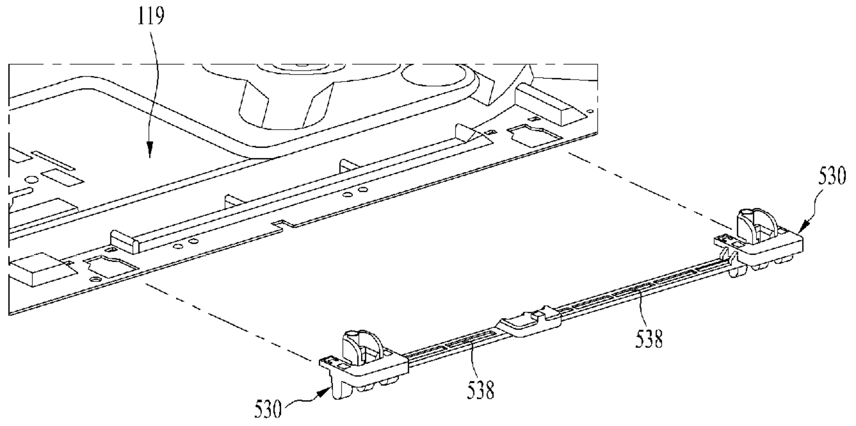
FIG. 30 is a view showing an example of a plurality of second bottom insulating members connected to an insulating connection portion.

FIG. 30 shows a state in which the plurality of second bottom insulating members 530 are formed integrally through an insulating connection portion 538. That is, in some implementations, the second bottom insulating member 530 can include a plurality of insulating protrusions 534 and a plurality of insulating supports 532 connected to each other through the insulating connection portion 538.

As described above, the plurality of second bottom insulating members 530 can be arranged for a stable support structure of the first cabinet 110. When the second bottom insulating members 530 are connected to each other through the insulating connection portion 538 as shown in FIG. 30, the plurality of second bottom insulating members 530 can be handled as one component, which can be advantageous in terms of manufacturing and handling.

The insulating connection portion 538 can be a portion of the second bottom insulating member 530 and can contain an insulating material. For example, the second bottom insulating member 530 can be made of the insulating material or can be coated with the insulating material.

FIG. 30 shows a state in which the plurality of second bottom insulating members 530 are connected with each other by the insulating connection portion 538 are coupled to one end of the first bottom panel 119 in the left and right direction Y.

Figure 31A:
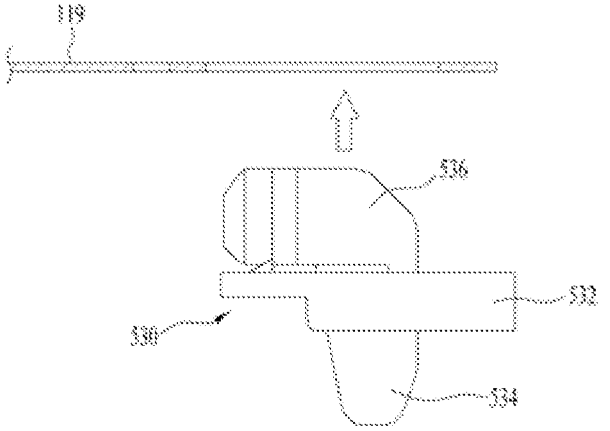
FIGS. 31A to 31C are views showing an example sequence in which the second bottom insulating member is being coupled to the first bottom panel.
Figure 31B:
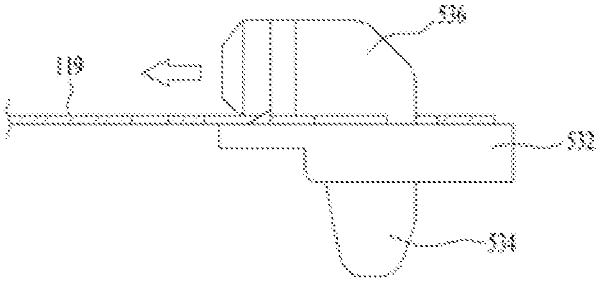
Figure 31C:
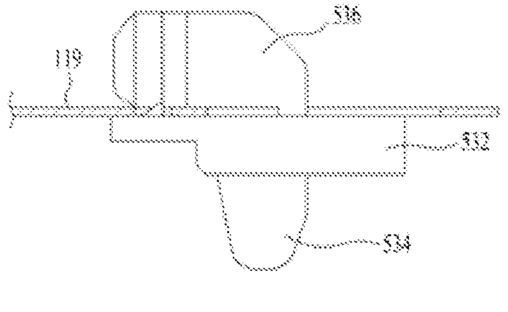

FIGS. 31A to 31C illustrate an example scheme of coupling each second bottom insulating member 530 with the first bottom panel 119. FIG. 31A shows a process in which the insulating coupling portion 536 of the second bottom insulating member 530 is inserted into the opening of the first bottom panel 119.

The insulating coupling portion 536 can have a shape protruding upward from the insulating support 532 of the second bottom insulating member 530. The insulating coupling portion 536 can be inserted into the opening of the first bottom panel 119 along the protruding direction.

FIG. 31B shows a process in which the second bottom insulating member 530 inserted into the first bottom panel 119 slides. Each second bottom insulating member 530 can have a groove defined therein extending in a sliding direction at a position between the insulating coupling portion 536 and the insulating support 532.

The groove is opened in a direction opposite to the first side panel 115 and can extend toward the first side panel 115. That is, the second bottom insulating member 530 can slide in the first bottom panel 119 in a direction away from the first side panel 115 to be coupled to the first bottom panel 119.

Accordingly, even when a pressing force by the first side panel 115 is generated in a state in which the insulating protrusion 534 is in contact with the inner face of the first side panel 115, the second bottom insulating member 530 can maintain a stable coupling structure without being separated from the first bottom panel 119 when considering the sliding direction for the coupling.

FIG. 31C shows the second bottom insulating member 530 that is completely coupled to the first bottom panel 119. As shown in FIG. 31B, the coupling between the second bottom insulating member 530 and the first bottom panel 119 can be terminated in a state in which the second bottom insulating member 530 is slid in a direction away from the first side panel 115.

The second bottom insulating member 530 can have a hook or the like allowing the second bottom insulating member 530 to be fixed to the first bottom panel 119 at a position at which the sliding is terminated.

Figure 32:
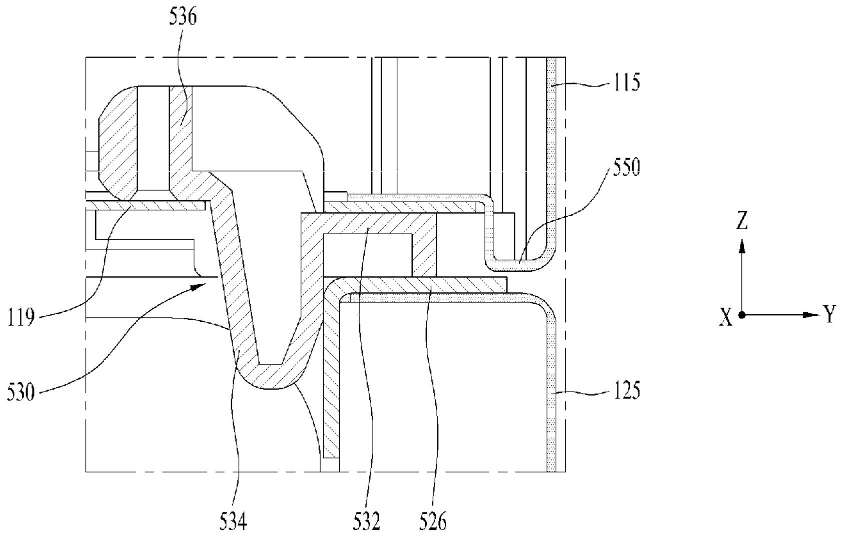
FIG. 32 is a front view showing a cross-section of the second bottom insulating member.

In some implementations, FIG. 32 shows a cross-section of the second bottom insulating member 530 at least partially positioned between the first side panel 115 and the second side panel 125 viewed from the front.

Referring to FIG. 32, in some implementations, the second bottom insulating member 530 can include the aforementioned insulating support 532, the insulating support 532 can be positioned between the first side panel 115 and the second side panel 125 to insulate the first side panel 115 and the second side panel 125 from each other, and the second side panel 125 can be constructed to support the first side panel 115 through the insulating support 532.

The insulating support 532 can have a bottom face in contact with the upper end of the second side panel 125 and a top face in contact with the lower end of the first side panel 115. The insulating support 532 can be directly or indirectly in contact with the first side panel 115 and the second side panel 125.

For example, the insulating support 532 can be directly in contact with the second side panel 125. Alternatively, when the reinforcing coupling portion 526 is disposed on the upper end of the second side panel 125, the bottom face of the insulating support 532 can be indirectly in contact with the second side panel 125 through the reinforcing coupling portion 526. The insulating support 532 can be supported by the second side panel 125 through the reinforcing coupling portion 526.

In some implementations, even when the entirety of the first bottom panel of the first cabinet 110 is not formed as the first bottom insulating member 510 made of the insulating material, the support relationship in which the electrical insulation between the first cabinet 110 and the second cabinet 120 is formed can be realized through the second bottom insulating member 530 including the insulating support 532.

In some implementations, the second bottom insulating member 530 can be advantageously used in a situation in which the first bottom panel of the first cabinet 110 is difficult to be formed as the first bottom insulating member 510 made of the insulating material.

For example, as described above, the first treating apparatus 10 can be the dryer including a heating device that consumes the electric energy or the like. When the heating device for generating high heat is included in the first treating apparatus 10, in particular, when the heating device is included in the base cabinet 15 above the first bottom panel 119, the first bottom insulating member 510 can be thermally damaged by the heat of the heating device when the first bottom panel 119 is formed as the first bottom insulating member 510 containing the insulating material.

In the above case, the first cabinet 110 can be constructed such that the first bottom panel 119 contains the metal material to enhance heat resistance unlike the first bottom insulating member 510. As the second bottom insulating member 530 is coupled to the first bottom panel 119, the electrical insulation and the stable support structure between the first treating apparatus 10 and the second treating apparatus 20 can be implemented.

In some implementations, as described above, each first side panel 115 can include the bottom extension portion 550, and the bottom extension portion 550 can extend downward of the first bottom panel 119 to shield the at least a portion of the insulating support 532 in the left and right direction Y.

Accordingly, even when the second bottom insulating members 530 are arranged, the spacing between the first side panel 115 and the second side panel 125 can be minimized. In addition, the second bottom insulating member 530 and the like can be shielded from the outside, so that the satisfaction of the user in design can be improved. In addition, the sense of unity between the first side panel 115 and the second side panel 125 can be formed, so that design completion can be improved.

In some implementations, referring to FIG. 32, in the case in which the second bottom insulating member 530 is disposed, the bottom extension portion 550 is disposed to be spaced apart from the second side panel 125 as described above, so that electrical separation between the first side panel 115 and the second side panel 125 can be achieved.

In some implementations, as described above, the top face of the second cabinet 120 can be opened, and the second bottom insulating member 530 can further include the insulating protrusion 534. The insulating protrusion 534 can protrude from the first bottom panel 119 and support the second side panel 125 in the left and right direction Y through the open top face of the second cabinet 120.

In some implementations, the first cabinet 110 and the second cabinet 120 can be spaced apart from each other through the insulating support 532 of the second bottom insulating member 530, the first cabinet 110 is stably supported on the second cabinet 120, and the first cabinet 110 is stably fixed without being moved in the left and right direction Y on the second cabinet 120 through the insulating protrusion 534.

Although the present disclosure has been illustrated and described in relation to a specific implementation, it is understood that the present disclosure can be variously improved and changed within the scope of the technical idea of the present disclosure provided by the following claims. It will be obvious to those of ordinary skill in the industry.

What is claimed is:

1. A stacked laundry treating apparatus comprising:
   - a first treating apparatus comprising:
     - a first cabinet,
     - a first drum disposed inside the first cabinet and configured to accommodate laundry, and
     - a first front panel coupled to a front side of the first cabinet;
   - a second treating apparatus that is disposed below the first treating apparatus and that supports the first treating apparatus, the second treating apparatus comprising:
     - a second cabinet,
     - a second drum disposed inside the second cabinet and configured to accommodate laundry, a second front panel coupled to a front side of the second cabinet, and an upper frame comprising (i) a lower part coupled to an upper portion of the front side of the second cabinet and (ii) an upper part coupled to a lower portion of the front side of the first cabinet;

a front insulating member that is made of an insulating material and that is exposed at the front side of the first cabinet; and a bottom insulating member that is made of an insulating material and that is disposed between a bottom side of the first cabinet and a top side of the second cabinet, wherein the bottom insulating member is arranged at the bottom side of the first cabinet such that the second cabinet supports the first cabinet via the bottom insulating member, and wherein the upper frame is connected to the first cabinet via the front insulating member and electrically insulates the front side of the first cabinet from the front side of the second cabinet.

2. The stacked laundry treating apparatus of claim 1, wherein the first cabinet comprises first side panels disposed at opposite sides of the first cabinet in a lateral direction, wherein the second cabinet comprises second side panels disposed at opposite sides of the second cabinet in the lateral direction, wherein the bottom insulating member is coupled to the first cabinet and covers the bottom side of the first cabinet, and wherein the bottom insulating member comprises an insulating panel that extends between the first side panels and the second side panels and that electrically insulates the first side panels from the second side panels.

3. The stacked laundry treating apparatus of claim 2, wherein the first treating apparatus further comprises a base cabinet disposed at the bottom side of the first cabinet that is open, the base cabinet comprising a compressor mounting portion, a motor mounting portion, a fan mounting portion, a water collecting portion, and a drain pump mounting portion, and wherein the bottom insulating member is integrally formed with the base cabinet and covers the bottom side of the first cabinet.

4. The stacked laundry treating apparatus of claim 2, wherein the first treating apparatus further comprises a base cabinet disposed at the bottom side of the first cabinet that is open, the base cabinet comprising having a compressor mounting portion, a motor mounting portion, a fan mounting portion, a water collection portion, and a drain pump mounting portion, and wherein the base cabinet is separately manufactured and positioned above the bottom insulating member.

5. The stacked laundry treating apparatus of claim 2, wherein the second treating apparatus further comprises a second top panel that is disposed at an upper end of the second cabinet and that extends in the lateral direction of the second cabinet, and wherein the second top panel is disposed between the first side panels and the second side panels and contacts the insulating panel, the second top panel supporting the insulating panel such that the first and second side panels are electrically insulated from each other.

6. The stacked laundry treating apparatus of claim 5, wherein the insulating panel and an outer end of the second top panel are positioned inward of outer surfaces of the first and second side panels.

7. The stacked laundry treating apparatus of claim 6, wherein outer ends of the insulating panel and the second top panel are aligned at a same position in the lateral direction.

8. The stacked laundry treating apparatus of claim 5, wherein the second top panel has a leg seating groove that is recessed downward and that includes inclined surfaces.

9. The stacked laundry treating apparatus of claim 8, wherein the first treating apparatus further comprises an insulating leg that protrudes toward the second top panel, and wherein the insulating leg is configured to, based on the first treating apparatus being stacked on the second treating apparatus, be guided along the inclined surfaces of the leg seating groove and supported by the second top panel.

10. The stacked laundry treating apparatus of claim 9, wherein the insulating leg protrudes downward from the bottom insulating member.

11. The stacked laundry treating apparatus of claim 1, wherein the first cabinet comprises first side panels disposed at opposite sides of the first cabinet in a lateral direction, wherein the second cabinet comprises second side panels disposed at opposite sides of the second cabinet in the lateral direction, and wherein the bottom insulating member comprises an insulating support that is disposed between the first and second side panels and that vertically separates and electrically insulates the first and second side panels from each other.

12. The stacked laundry treating apparatus of claim 11, wherein an upper surface of the insulating support contacts a bottom surface of the first side panels, and wherein a lower surface of the insulating support contacts a top surface of the second side panels.

13. The stacked laundry treating apparatus of claim 11, wherein the bottom insulating member is separately manufactured from the first treating apparatus and is disposed between the first and second side panels.

14. The stacked laundry treating apparatus of claim 11, wherein the bottom insulating member further comprises an insulating protrusion that extends downward from the insulating support, the insulating protrusion being positioned at an open top surface of the second cabinet and laterally supporting the second side panels.

15. The stacked laundry treating apparatus of claim 12, wherein the second treating apparatus further comprises a reinforcing coupling portion that is disposed at an upper portion of the second side panels and that extends in a front-rear direction, and wherein the insulating support is supported by the reinforcing coupling portion.

16. The stacked laundry treating apparatus of claim 1, wherein the first cabinet comprises first side panels disposed at opposite sides of the first cabinet in a lateral direction, wherein the second cabinet comprises second side panels disposed at opposite sides of the second cabinet in the lateral direction, wherein the bottom insulating member comprises:

a first bottom insulating member that is coupled to the first cabinet and that covers the bottom side of the first cabinet, the first bottom insulating member comprising an insulating panel that extends between the first side panels and the second side panels and that electrically insulates the first side panels from the second side panels; and a second bottom insulating member disposed between the first side panels and the second side panels, the second bottom insulating member comprising an insulating support that is positioned between the first side panels and the second side panels, wherein an upper surface of the insulating support contacts a bottom surface of the first side panels, wherein a lower surface of the insulating support contacts a top surface of the second side panels, and wherein the first and second side panels are separated and electrically insulated from each other by the insulating panel and the insulating support.

17. The stacked laundry treating apparatus of claim 16, wherein the second treating apparatus further comprises a second top panel that is disposed at an upper end of the second cabinet and that extends in the lateral direction of the second cabinet, and wherein the second top panel is disposed between the first side panels and the second side panels and contacts the insulating panel, the second top panel supporting the insulating panel such that the first and second side panels are electrically insulated from each other.

18. The stacked laundry treating apparatus of claim 17, wherein outer ends of the insulating panel and the second top panel are positioned inward of outer surfaces of the first and second side panels.

19. The stacked laundry treating apparatus of claim 18, wherein the second bottom insulating member further comprises an insulating protrusion that extends downward from the insulating support, the insulating protrusion being positioned at an open top surface of the second cabinet and laterally supporting the second side panels.

* * * * *